US009912643B2

(12) United States Patent
Pan

(10) Patent No.: US 9,912,643 B2
(45) Date of Patent: Mar. 6, 2018

(54) ATTACK DEFENSE PROCESSING METHOD AND PROTECTION DEVICE

(71) Applicant: Huawei Technologies Co., Ltd., Shenzhen (CN)

(72) Inventor: Yongbo Pan, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 251 days.

(21) Appl. No.: 14/869,132

(22) Filed: Sep. 29, 2015

(65) Prior Publication Data

US 2016/0021062 A1 Jan. 21, 2016

Related U.S. Application Data

(63) Continuation of application No. PCT/CN2013/078003, filed on Jun. 26, 2013.

(51) Int. Cl.
*H04L 29/00* (2006.01)
*H04L 29/06* (2006.01)
(Continued)

(52) U.S. Cl.
CPC ...... *H04L 63/0281* (2013.01); *G06F 17/2705* (2013.01); *H04L 61/2007* (2013.01);
(Continued)

(58) Field of Classification Search
CPC ............. H04L 63/0281; H04L 61/2007; G06F 17/2705
(Continued)

(56) References Cited

U.S. PATENT DOCUMENTS

| 7,304,959 B1 | 12/2007 | Swaroop et al. |
| 2010/0125900 A1* | 5/2010 | Dennerline ......... H04L 63/0227 726/13 |
| 2012/0051236 A1* | 3/2012 | Hegde ................. H04L 43/10 370/252 |

FOREIGN PATENT DOCUMENTS

| CN | 1909503 A | 2/2007 |
| CN | 102325076 A | 1/2012 |

(Continued)

OTHER PUBLICATIONS

Schulz, S., et al., "Tetherway: A Framework for Tethering Camouflage," XP002711963, WiSec, Proceedings of the Fifth ACM Conference on Security and Privacy in Wireless and Mobile Networks, Apr. 16-18, 2012, 11 pages.

(Continued)

*Primary Examiner* — Brandon Hoffman
*Assistant Examiner* — Michael D Anderson
(74) *Attorney, Agent, or Firm* — Conley Rose, P.C.

(57) ABSTRACT

An attack defense processing method and a protection device. The attack defense processing method includes the protection device receives a first packet by a protection device, if it is determined that the first packet is an Internet Control Message Protocol version 6 (ICMPv6) Packet Too Big packet, parses the first packet to obtain an internet protocol (IP) address of a source node, an IP address of a destination node, and a Maximum Transmission Unit (MTU) value that are carried in the first packet, determines a range of valid MTUs on a path between the source node and the destination node according to the IP address of the source node and the IP address of the destination node, and performs attack defense processing for the first packet when it is determined that the MTU value does not belong to the range of the valid MTUs.

21 Claims, 13 Drawing Sheets

(51) Int. Cl.
*G06F 17/27* (2006.01)
*H04L 29/12* (2006.01)

(52) U.S. Cl.
CPC ...... *H04L 63/0245* (2013.01); *H04L 63/1466* (2013.01); *H04L 69/16* (2013.01); *H04L 63/164* (2013.01); *H04L 63/166* (2013.01)

(58) Field of Classification Search
USPC .......................................................... 726/13
See application file for complete search history.

(56) References Cited

FOREIGN PATENT DOCUMENTS

| | | | |
|---|---|---|---|
| CN | 102412924 | A | 4/2012 |
| CN | 102594810 | A | 7/2012 |
| KR | 20140014932 | A * | 2/2014 |

OTHER PUBLICATIONS

Gont, F., "ICMP Attacks against TCP," RFC 5927, Jul. 2010, 36 pages.

Foreign Communication From a Counterpart Application, European Application No. 13888342.6, Extended European Search Report dated Feb. 29, 2016, 7 pages.
Partial English Translation and Abstract of Chinese Patent Application No. CN102325076, Nov. 25, 2015, 27 pages.
Partial English Translation and Abstract of Chinese Patent Application No. CN001909503, Aug. 31, 2015, 6 pages.
Partial English Translation and Abstract of Chinese Patent Application No. CN102594810, Aug. 31, 2015, 4 pages.
Foreign Communication From a Counterpart Application, Chinese Application No. 201380000558.3, Chinese Office Action dated Aug. 31, 2015, 5 pages.
Foreign Communication From a Counterpart Application, Chinese Application No. 201380000558.3, Chinese Search Report dated Aug. 6, 2015, 2 pages.
Foreign Communication From a Counterpart Application, PCT Application No. PCT/CN2013/078003, English Translation of International Search Report dated Apr. 3, 2014, 2 pages.
Foreign Communication From a Counterpart Application, PCT Application No. PCT/CN2013/078003, Written Opinion dated Apr. 3, 2014, 4 pages.
Conta, A., et al.,"Internet Control Message Protocol (ICMPv6) for the Internet Protocol Version 6 (IPv6) Specification", Network Working Group, RFC4443, Mar. 2006, 24 pages.

* cited by examiner

US 9,912,643 B2

ATTACK DEFENSE PROCESSING METHOD AND PROTECTION DEVICE

CROSS-REFERENCE TO RELATED APPLICATIONS

This application is a continuation of International Application No. PCT/CN2013/078003, filed on Jun. 26, 2013, which is hereby incorporated by reference in its entirety.

TECHNICAL FIELD

The present disclosure relates to communication technologies, and in particular, to an attack defense processing method and a protection device.

BACKGROUND

At present, problems of address resource shortages and insufficient support for new services are gradually exposed during use of Internet Protocol version 4 (IPv4). Internet Protocol version 6 (IPv6) is in a stage of small-scale piloting to large-scale use. With the large-scale use of the IPv6, its security problem becomes increasingly prominent, affecting operations of operators.

A path maximum transmission unit (MTU) is a technology used in various protocols to search for an MTU supported on an entire path on the Internet, and fragmentation transmission may not be performed for data less than an MTU limitation. A path MTU discovery mechanism discovers a minimal MTU on all paths from a source node to a destination node by using an Internet Control Message Protocol version 6 (ICMPv6) protocol.

The IPv6 protocol specifies that a data forwarding node does not perform a fragmentation operation, the source node performs the fragmentation, and the destination node performs fragment reassembly. If the path MTU discovery mechanism is not used, a node on an IPv6 network uses default 1280 bytes as a path MTU, and a fragmentation operation needs to be performed for all data packets greater than 1280 bytes. Therefore, by using the path MTU discovery mechanism, a probability of fragmentation can be lowered, and at the same time network transmission efficiency can be improved.

Based on the foregoing path MTU discovery mechanism, a malicious node may increase a processing load of an attacked node by sending a forged and false Internet Control Message Protocol (ICMP) message to the attacked node, thereby causing a stacking overload of the attacked node or interruption of normal communication between the attacked node and one or more other nodes.

At present, generally a path MTU attack can be avoided only by disabling the function of the path MTU discovery mechanism. However, this reduces the network transmission efficiency. Therefore, no effective protection measures are provided.

SUMMARY

The present disclosure provides an attack defense processing method and a protection device to resolve a problem that a path MTU attack cannot be prevented effectively.

A first aspect of the present disclosure provides an attack defense processing method, including receiving, by a protection device, a first packet, if the protection device determines that the first packet is an ICMPv6 Packet Too Big packet, parsing, by the protection device, the first packet to obtain an Internet Protocol (IP) address of a source node, an IP address of a destination node, and an MTU value that are carried in the first packet, determining, by the protection device, a range of valid MTUs on a path between the source node and the destination node according to the IP address of the source node and the IP address of the destination node; and performing, by the protection device, attack defense processing for the first packet if the protection device determines that the MTU value does not belong to the range of the valid MTUs on the path between the source node and the destination node.

With reference to the first aspect, in a first possible implementation manner of the first aspect, the determining, by the protection device, a range of valid MTUs on a path between the source node and the destination node according to the IP address of the source node and the IP address of the destination node includes obtaining, by the protection device according to the IP address of the source node and the IP address of the destination node, a value of an MTU on the path from the source node to the destination node and a value of an MTU on the path from the destination node to the source node that are saved on the protection device, determining that an upper limit of the range of the valid MTUs on the path between the source node and the destination node is the greater one of the value of the MTU on the path from the source node to the destination node and the value of the MTU on the path from the destination node to the source node, and determining that a lower limit of the range of the valid MTUs on the path between the source node and the destination node is the smaller one of the value of the MTU on the path from the source node to the destination node and the value of the MTU on the path from the destination node to the source node, or querying and obtaining, by the protection device according to the IP address of the source node and the IP address of the destination node, a path MTU range configured for the path between the source node and the destination node from a saved correspondence between an IP address pair and a path MTU range.

With reference to the first aspect or the first possible implementation manner of the first aspect, in a second possible implementation manner of the first aspect, the performing, by the protection device, attack defense processing for the first packet includes discarding, by the protection device, the first packet to trigger retransmission of an ICMPv6 Packet Too Big packet if the protection device determines that the first packet is an initial packet of a data flow to which the first packet belongs; and if the protection device receives a retransmitted second packet within a preset first time duration, and the second packet is an ICMPv6 Packet Too Big packet, determining, by the protection device, that the first packet is a normal ICMPv6 Packet Too Big packet, and discharging the second packet.

With reference to the second possible implementation manner of the first aspect, in a third possible implementation manner of the first aspect, the method further includes, if the protection device determines that the first packet is not the initial packet of the data flow to which the first packet belongs, or the protection device does not receive a retransmitted second packet within the preset first time duration, generating, by the protection device, a probe packet and sending the probe packet to the source node, where a packet length of the probe packet is greater than the MTU value obtained by the protection device from the first packet, and an authentication field is included in the probe packet, if the protection device receives a third packet within a preset second time duration, and the third packet is an ICMPv6

Packet Too Big packet, determining, by the protection device, whether an authentication field is included in the third packet, if an authentication field is included in the third packet, determining, by the protection device, whether a value of the authentication field in the third packet is the same as a value of the authentication field in the probe packet, if the value of the authentication field in the third packet is the same as the value of the authentication field in the probe packet, comparing, by the protection device, the MTU value carried in the first packet and an MTU value carried in the third packet, and determining, by the protection device, that the first packet is a normal ICMPv6 Packet Too Big packet if a difference between the MTU value carried in the first packet and the MTU value carried in the third packet is less than a preset threshold.

With reference to the first aspect or the first possible implementation manner of the first aspect, in a fourth possible implementation manner of the first aspect, the performing, by the protection device, attack defense processing for the first packet includes generating, by the protection device, a probe packet and sending the probe packet to the source node, where a packet length of the probe packet is greater than the MTU value obtained by the protection device from the first packet, and an authentication field is included in the probe packet, if the protection device receives a third packet within a preset second time duration, and the third packet is an ICMPv6 Packet Too Big packet, determining, by the protection device, whether an authentication field is included in the third packet, if an authentication field is included in the third packet, determining, by the protection device, whether a value of the authentication field in the third packet is the same as a value of the authentication field in the probe packet, if the value of the authentication field in the third packet is the same as the value of the authentication field in the probe packet, comparing, by the protection device, the MTU value carried in the first packet and an MTU value carried in the third packet, and determining, by the protection device, that the first packet is a normal ICMPv6 Packet Too Big packet if a difference between the MTU value carried in the first packet and the MTU value carried in the third packet is less than a preset threshold.

With reference to the second, third, or fourth possible implementation manner of the first aspect, in a fifth possible implementation manner of the first aspect, after the determining, by the protection device, that the first packet is a normal ICMPv6 Packet Too Big packet, the method further includes updating, by the protection device, the saved value of the MTU on the path from the source node to the destination node to the MTU value obtained by the protection device from the first packet.

With reference to the first aspect, in a sixth possible implementation manner of the first aspect, after the receiving, by a protection device, a first packet, the method further includes, if the protection device determines that the first packet is not an ICMPv6 Packet Too Big packet, and the protection device determines that the first packet is a normal service packet, parsing, by the protection device, the first packet to obtain the IP address of the source node and the IP address of the destination node that are carried in the first packet, and determining whether a packet length of the first packet is greater than a saved value of an MTU on a path from the source node to the destination node, and updating, by the protection device, the value of the MTU on the path from the source node to the destination node to the packet length of the first packet if the first packet is a normal service packet, and the packet length of the first packet is greater than the saved value of the MTU on the path from the source node to the destination node.

A second aspect of the present disclosure provides a protection device, including a receiving module configured to receive a first packet, a determining module configured to determine whether the first packet received by the receiving module is an Internet Control Message Protocol version 6 ICMPv6 Packet Too Big packet, a parsing module configured to, when the determining module determines that the first packet is an ICMPv6 Packet Too Big packet, parse the first packet to obtain an Internet Protocol IP address of a source node, an IP address of a destination node, and an MTU value that are carried in the first packet, where the determining module is further configured to determine a range of valid MTUs on a path between the source node and the destination node according to the IP address of the source node and the IP address of the destination node that are obtained by the parsing module, and determine whether the MTU value obtained by the parsing module belongs to the range of the valid MTUs on the path between the source node and the destination node, and a protection module configured to perform attack defense processing for the first packet received by the receiving module when the determining module determines that the MTU value obtained by the parsing module does not belong to the range of the valid MTUs on the path between the source node and the destination node.

With reference to the second aspect, in a first possible implementation manner of the second aspect, the protection module includes a determining unit configured to determine whether the first packet received by the receiving module is an initial packet of a data flow to which the first packet belongs, a discarding unit configured to discard the first packet to trigger retransmission of an ICMPv6 Packet Too Big packet when the determining unit determines that the first packet is the initial packet of the data flow to which the first packet belongs, and a first discharging unit configured to, when a retransmitted second packet is received within a preset first time duration, and the second packet is an ICMPv6 Packet Too Big packet, determine that the first packet is a normal ICMPv6 Packet Too Big packet and discharge the second packet.

With reference to the first possible implementation manner of the second aspect, in a second possible implementation manner of the second aspect, the protection module further includes a first generating unit configured to generate a probe packet when the determining unit determines that the first packet is not the initial packet of the data flow to which the first packet belongs, or a retransmitted second packet is not received within the preset first time duration, where a packet length of the probe packet is greater than the MTU value obtained by the parsing module from the first packet, and an authentication field is included in the probe packet, a first sending unit configured to send the probe packet generated by the first generating unit to the source node, a first determining unit configured to, when a third packet is received within a preset second time duration, and the third packet is an ICMPv6 Packet Too Big packet, determine whether an authentication field is included in the third packet, and when the authentication field is included in the third packet, determine whether a value of the authentication field in the third packet is the same as a value of the authentication field in the probe packet, and a first comparing unit configured to compare the MTU value carried in the first packet and an MTU value carried in the third packet when the first determining unit determines that the value of the authentication field in the third packet is the same as the value of the authentication field in the probe packet, where the first discharging unit is further configured to determine that the first packet is a normal ICMPv6 Packet Too Big packet when the first comparing unit determines that a difference between the MTU value carried in the first packet and the MTU value carried in the third packet is less than a preset threshold.

With reference to the second aspect, in a third possible implementation manner of the second aspect, the protection module includes a second generating unit configured to generate a probe packet, where a packet length of the probe packet is greater than the MTU value obtained by the parsing module from the first packet, and an authentication field is included in the probe packet, a second sending unit configured to send the probe packet generated by the second generating unit to the source node, a second determining unit configured to, when a third packet is received within a preset second time duration, and the third packet is an ICMPv6 Packet Too Big packet, determine whether an authentication field is included in the third packet; and when the authentication field is included in the third packet, determine whether a value of the authentication field in the third packet is the same as a value of the authentication field in the probe packet, a second comparing unit configured to compare the MTU value carried in the first packet and an MTU value carried in the third packet when the second determining unit determines that the value of the authentication field in the third packet is the same as the value of the authentication field in the probe packet, and a second discharging unit configured to determine that the first packet is a normal ICMPv6 Packet Too Big packet when the second comparing unit determines that a difference between the MTU value carried in the first packet and the MTU value carried in the third packet is less than a preset threshold.

With reference to the first, second, or third possible implementation manner of the second aspect, in a fourth possible implementation manner of the second aspect, the protection device further includes an updating module configured to, after it is determined that the first packet is a normal ICMPv6 Packet Too Big packet, update the saved value of the MTU on the path from the source node to the destination node to the MTU value obtained by the parsing module from the first packet.

With reference to the second aspect, in a fifth possible implementation manner of the second aspect, the protection module further includes an updating module, where the parsing module is further configured to, when the determining module determines that the first packet is not an ICMPv6 Packet Too Big packet, and the determining module determines that the first packet is a normal service packet, parse the first packet to obtain the IP address of the source node and the IP address of the destination node that are carried in the first packet, the determining module is further configured to determine whether the packet length of the first packet is greater than the saved value of the MTU on the path from the source node to the destination node, and the updating module is configured to, when the determining module determines that the first packet is a normal service packet, and the packet length of the first packet is greater than the saved value of the MTU on the path from the source node to the destination node, update the value of the MTU on the path from the source node to the destination node to the packet length of the first packet.

A third aspect of the present disclosure provides a protection device, including a transmitter, a receiver, a memory, and a processor separately connected to the transmitter, the receiver, and the memory, where the receiver is configured to receive a first packet, the memory is configured to store program code, and the processor is configured to call and perform the program code stored in the memory to implement the following functions. When it is determined that the first packet received by the receiver is an ICMPv6 Packet Too Big packet, parsing the first packet to obtain an IP address of a source node, an IP address of a destination node, and an MTU value that are carried in the first packet; determining a range of valid MTUs on a path between the source node and the destination node according to the IP address of the source node and the IP address of the destination node; and performing attack defense processing for the first packet when it is determined that the MTU value does not belong to the range of the valid MTUs on the path between the source node and the destination node.

With reference to the third aspect, in a first possible implementation manner of the third aspect, that the processor is configured to perform attack defense processing for the first packet includes The processor is configured to, when it is determined that the first packet is an initial packet of a data flow to which the first packet belongs, discard the first packet to trigger retransmission of an ICMPv6 Packet Too Big packet; and if a retransmitted second packet is received within a preset first time duration, and the second packet is an ICMPv6 Packet Too Big packet, determine that the first packet is a normal ICMPv6 Packet Too Big packet and discharge the second packet.

With reference to the first possible implementation manner of the third aspect, in a second possible implementation manner of the third aspect, the processor is further configured to, when it is determined that the first packet is not the initial packet of the data flow to which the first packet belongs, or the receiver does not receive the retransmitted second packet within the preset first time duration, generate a probe packet, where a packet length of the probe packet is greater than the MTU value obtained by the processor from the first packet, and an authentication field is included in the probe packet; after the transmitter sends the probe packet to the source node, when the receiver receives a third packet within a preset second time duration, and the third packet is an ICMPv6 Packet Too Big packet, determine whether an authentication field is included in the third packet; if an authentication field is included in the third packet, determine whether a value of the authentication field in the third packet is the same as a value of the authentication field in the probe packet; if the value of the authentication field in the third packet is the same as the value of the authentication field in the probe packet, compare the MTU value carried in the first packet and an MTU value carried in the third packet received by the receiver; and if a difference between the MTU value carried in the first packet and the MTU value carried in the third packet is less than a preset threshold, determine that the first packet is a normal ICMPv6 Packet Too Big packet, and the transmitter is configured to send the probe packet generated by the processor to the source node.

With reference to the third aspect, in a third possible implementation manner of the third aspect, that the processor is configured to perform attack defense processing for the first packet includes The processor is configured to generate a probe packet, where a packet length of the probe packet is greater than the MTU value obtained by the processor from the first packet, and an authentication field is included in the probe packet; after the transmitter sends the probe packet to the source node, when the receiver receives a third packet within a preset second time duration, and the third packet is an ICMPv6 Packet Too Big packet, determine whether an authentication field is included in the third packet; if an authentication field is included in the third packet, determine whether a value of the authentication field in the third packet is the same as a value of the authentication field in the probe packet; if the value of the authentication field in the third packet is the same as the value of the authentication field in the probe packet, compare the MTU value carried in the first packet and an MTU value carried in the third packet received by the receiver; and if a difference between the MTU value carried in the first packet and the MTU value carried in the third packet is less than a preset threshold, determine that the first packet is a normal ICMPv6 Packet Too Big packet, and the transmitter is configured to send the probe packet generated by the processor to the source node.

With reference to the first, second, or third possible implementation manner of the third aspect, in a fourth possible implementation manner of the third aspect, the processor is further configured to, after it is determined that the first packet is a normal ICMPv6 Packet Too Big packet, update the value of the MTU on the path from the source node to the destination node to the MTU value obtained by the processor from the first packet.

With reference to the third aspect, in a fifth possible implementation manner of the third aspect, the processor is further configured to, when it is determined that the first packet received by the receiver is not an ICMPv6 Packet Too Big packet, and it is determined that the first packet received by the receiver is a normal service packet, parse the first packet to obtain the IP address of the source node and the IP address of the destination node that are carried in the first packet, and determine whether a packet length of the first packet is greater than the value of the MTU on the path from the source node to the destination node; and if the packet length of the first packet is greater than the value of the MTU on the path from the source node to the destination node, update the value of the MTU on the path from the source node to the destination node to the packet length of the first packet.

The technical effects of the present disclosure are as follows. After a protection device receives a first packet, if it is determined that the first packet is an ICMPv6 Packet Too Big packet, the protection device parses the first packet to obtain an IP address of a source node, an IP address of a destination node, and an MTU value that are carried in the first packet; if the protection device determines that the MTU value does not belong to a range of valid MTUs on a path between the source node and the destination node, the protection device determines that the first packet is an attack ICMPv6 Packet Too Big packet, so that the protection device performs attack defense processing for the first packet. Therefore, a normal ICMPv6 Packet Too Big packet can be distinguished from the attack ICMPv6 Packet Too Big packet on the protection device, thereby implementing protection against a path MTU attack.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and persons of ordinary skill in the art may still derive other drawings from these accompanying drawings without creative efforts.

FIG. 2A-1 and FIG. 2A-2 are a flowchart of an attack defense processing method according to another embodiment of the present disclosure.

FIG. 2B-1, FIG. 2B-2, and FIG. 2B-3 are a flowchart of an attack defense processing method according to still another embodiment of the present disclosure.

FIG. 3 is a schematic diagram of an application scenario according to an embodiment of the present disclosure.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by persons of ordinary skill in the art based on the embodiments of the present disclosure without creative efforts shall fall within the protection scope of the present disclosure.

During the process of implementing the present disclosure, it is found that an existing attack is performed by using a path MTU discovery mechanism mainly in the following two manners. Manner 1. Forge a false ICMP message to deliberately reduce a path MTU.

Malicious node A may forge a false ICMP message to inform node B of an MTU allowed on the path. If the MTU of which node B is informed by using the false ICMP message is much less than an actual path MTU, node B needs to send a much smaller packet to node A subsequently. In this way, not only a processing overhead of node B is increased, but also more network bandwidth is occupied (all packet headers of data packets added for this reason belong to extra overheads). Further, this may reduce communication efficiency. If the MTU of which node B is informed by malicious node A is extremely small, stacking overload of the Transmission Control Protocol (TCP)/IP in a local system of node B may occur.

Manner 2. Forge a false ICMP message to deliberately increase a path MTU.

Malicious node A counterfeits node C and sends a false ICMP message to node B, which is a previous hop of node C. An MTU of which node B is informed by using the false ICMP message is much greater than an MTU on a path between node B and node C. In this way, the MTU on the path between node B and node C may be increased, so node C cannot obtain or process a packet sent by node B, thereby causing a temporary communication interruption.

Figure 1A:
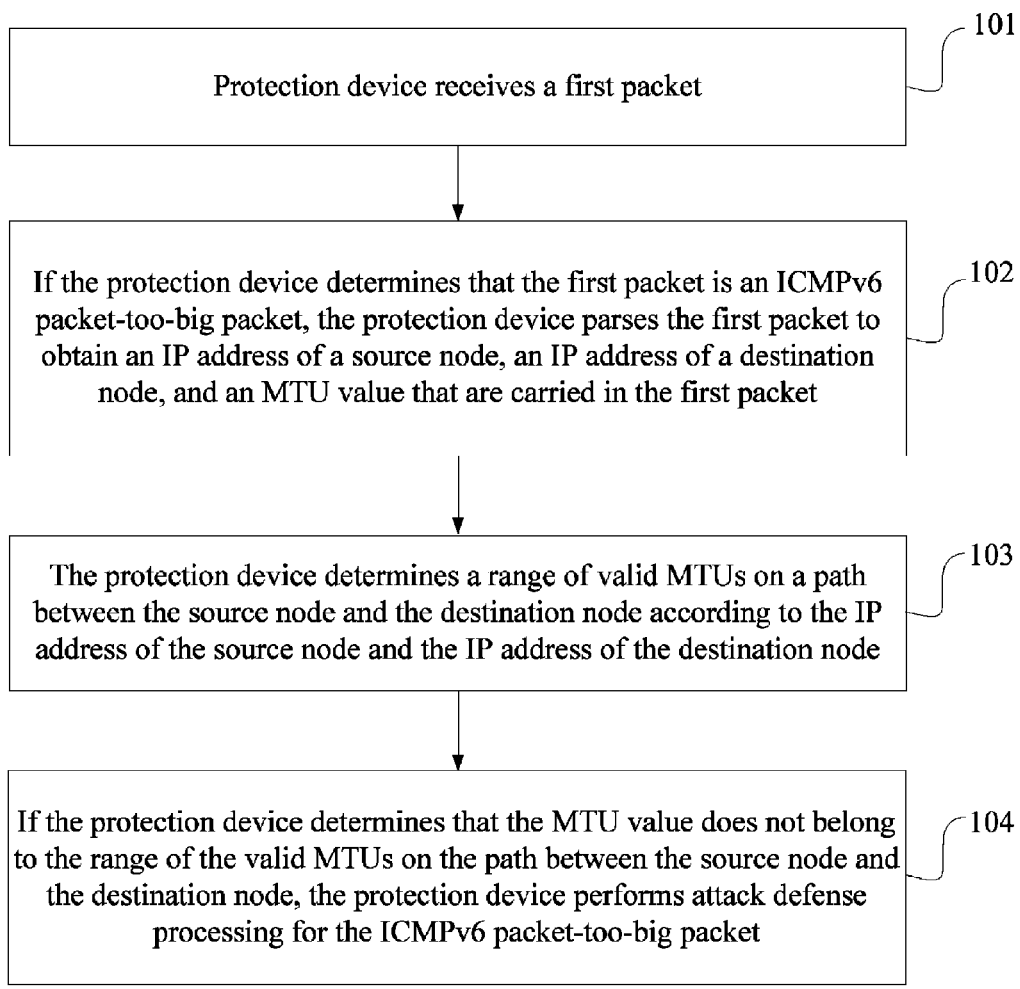
FIG. 1A is a flowchart of an attack defense processing method according to an embodiment of the present disclosure.

FIG. 1A is a flowchart of an attack defense processing method according to an embodiment of the present disclosure. As shown in FIG. 1A, the attack defense processing method may include Step 101: A protection device receives a first packet.

Step 102: If the protection device determines that the first packet is an ICMPv6 Packet Too Big packet, the protection device parses the first packet to obtain an IP address of a source node, an IP address of a destination node, and an MTU value that are carried in the first packet.

The protection device determines that the first packet is an ICMPv6 Packet Too Big packet as follows. The protection device obtains a value of a protocol field that is carried in an IP header of the first packet; if the value of the protocol field indicates that an upper-layer protocol type encapsulated at an IP layer is ICMPv6, the protection device determines that the packet is an ICMPv6 packet; and further, the protection device obtains a value of an ICMP-type field in a basic header of the ICMPv6 packet and determines that the packet is an ICMPv6 Packet Too Big packet according to the value of the ICMP-type field.

Step 103: The protection device determines a range of valid MTUs on a path between the source node and the destination node according to the IP address of the source node and the IP address of the destination node.

Step 104: If the protection device determines that the MTU value does not belong to the range of the valid MTUs on the path between the source node and the destination node, the protection device performs attack defense processing for the ICMPv6 Packet Too Big packet.

In step 103, manners of determining, by the protection device, the range of the valid MTUs on the path between the source node and the destination node according to the IP address of the source node and the IP address of the destination node include but are not limited to the following two types: the protection device obtains, according to the IP address of the source node and the IP address of the destination node, a value of an MTU on a path from the source node to the destination node and a value of an MTU on a path from the destination node to the source node that are saved on the protection device, determines that an upper limit of the range of the valid MTUs on the path between the source node and the destination node is the greater one of the value of the MTU on the path from the source node to the destination node and the value of the MTU on the path from the destination node to the source node, and determines that a lower limit of the range of the valid MTUs on the path between the source node and the destination node is the smaller one of the value of the MTU on the path from the source node to the destination node and the value of the MTU on the path from the destination node to the source node, or, the protection device queries and obtains a path MTU range configured for the path between the source node and the destination node from a saved correspondence between an IP address pair and a path MTU range according to the IP address of the source node and the IP address of the destination node. In this case, the protection device may determine that the upper limit of the range of the valid MTUs on the path between the source node and the destination node is an upper limit of the configured path MTU range, and the lower limit of the range of the valid MTUs on the path between the source node and the destination node is a lower limit of the configured path MTU range. The path MTU range configured for the path between the source node and the destination node may be set during specific implementation, and is not limited herein.

In step 104, that the protection device determines that the MTU value does not belong to the range of the valid MTUs on the path between the source node and the destination node may be as follows: the protection device determines that the MTU value is less than the lower limit of the range of the MTUs on the path between the source node and the destination node, or the protection device determines that the MTU value is greater than the upper limit of the range of the valid MTUs on the path between the source node and the destination node.

In the following, a manner of performing attack defense processing by a protection device for a first packet in step 104 is introduced.

Figures 1, 1B:
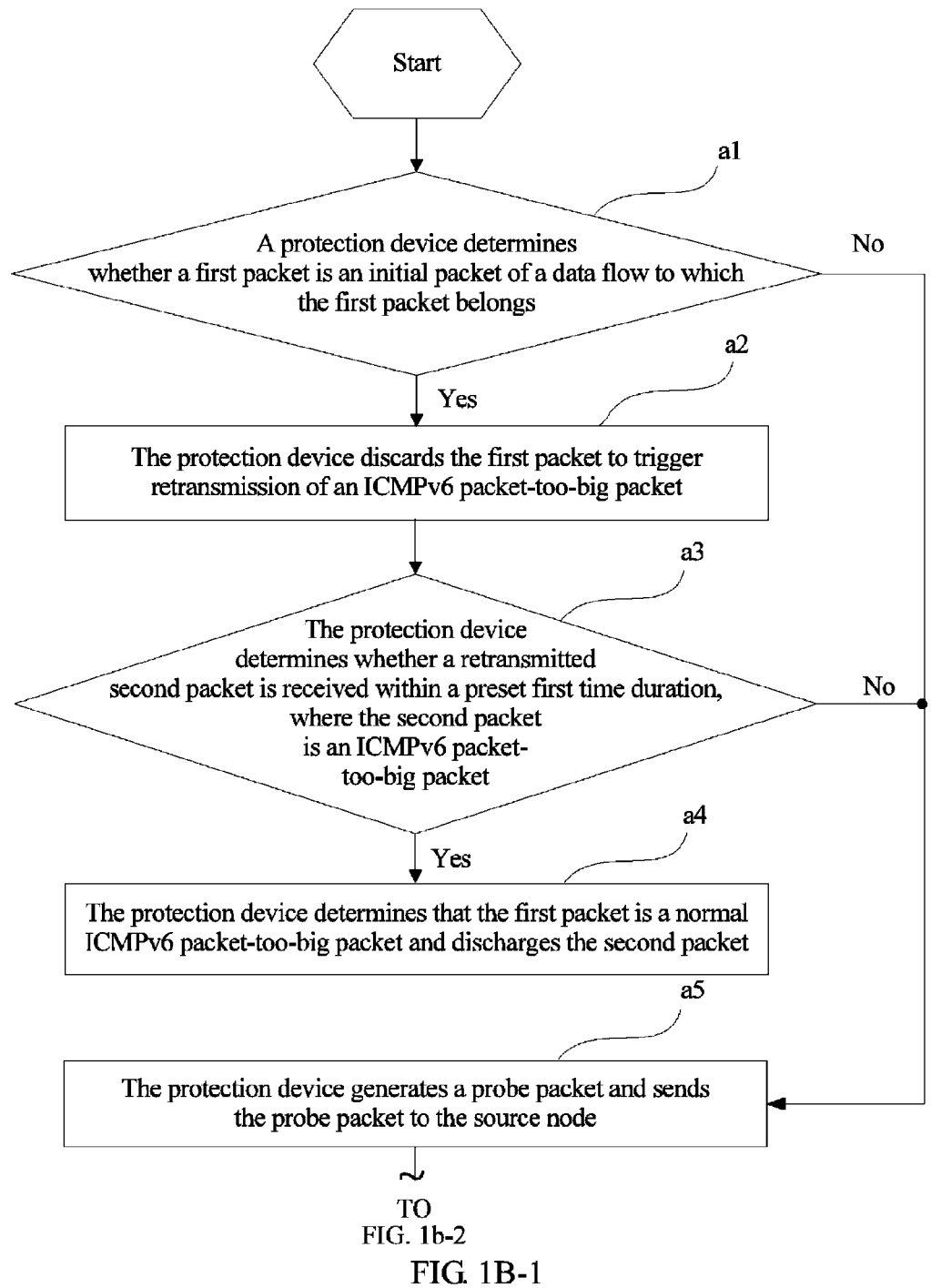
FIG. 1B-1 and FIG. 1B-2 are a flowchart of a manner of performing attack defense processing by a protection device for a first packet according to an embodiment of the present disclosure.
Figures 1, 1B, 2:
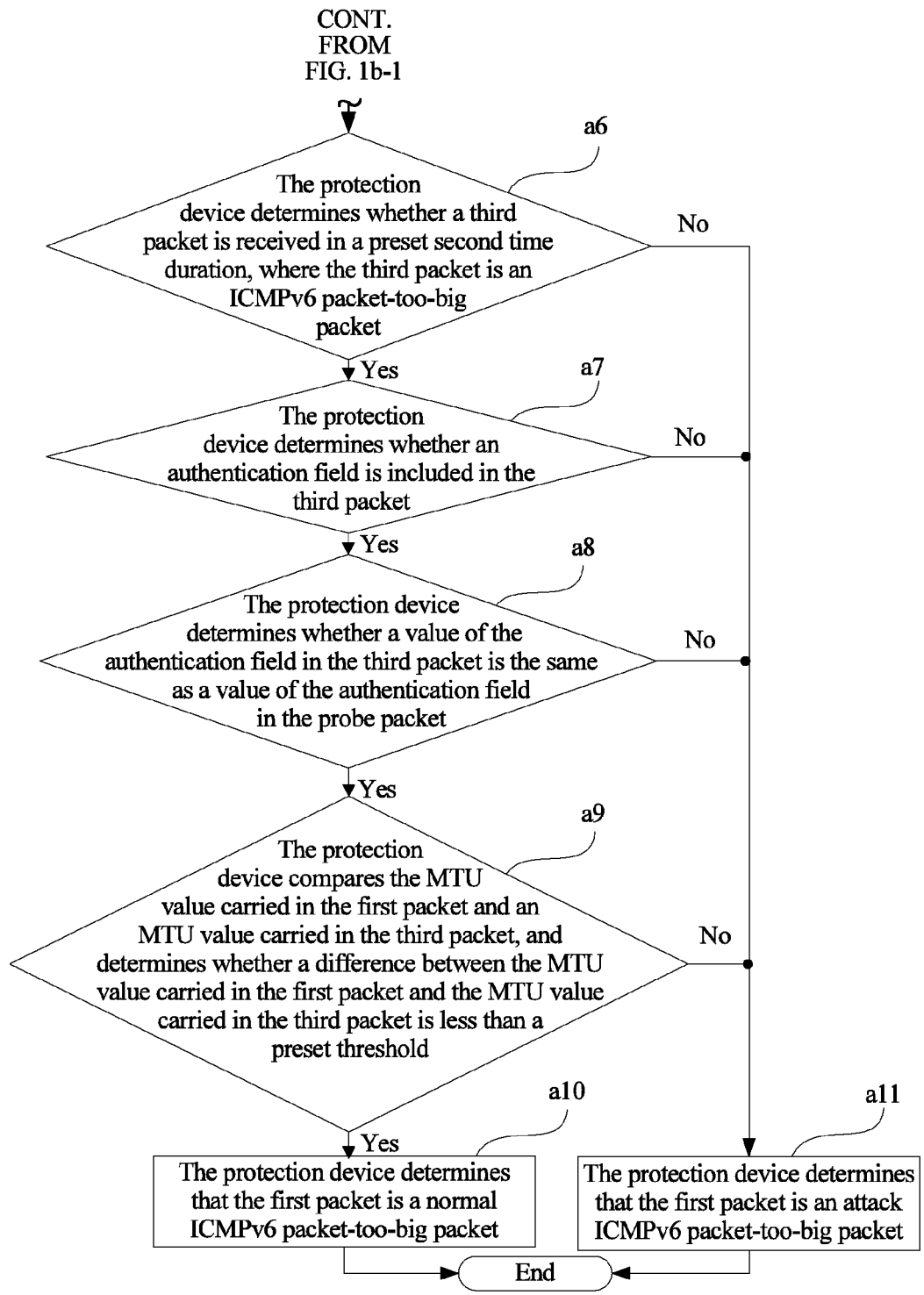

FIG. 1B-1 and FIG. 1B-2 is a flowchart of a manner of performing attack defense processing by a protection device for a first packet according to an embodiment of the present disclosure. As shown in FIG. 1B-1, the manner may include Step a1: A protection device determines whether a first packet is an initial packet of a data flow to which the first packet belongs; if the first packet is the initial packet of the data flow to which the first packet belongs, perform step a2; and optionally, if the protection device determines that the first packet is not the initial packet of the data flow to which the first packet belongs, perform step a5.

Step a2: The protection device discards the first packet to trigger retransmission of an ICMPv6 Packet Too Big packet.

Step a3: The protection device determines whether a retransmitted second packet is received within a preset first time duration, where the second packet is an ICMPv6 Packet Too Big packet; if the retransmitted second packet is received within the preset first time duration, perform step a4; and optionally, if the protection device determines that the retransmitted second packet is not received within the preset first time duration, perform step a5.

The preset first time duration may be set according to system performance and the like during specific implementation. A length of the preset first time duration is not limited in this embodiment. For example, the preset first time duration may be 5 seconds (s).

Step a4: The protection device determines that the first packet is a normal ICMPv6 Packet Too Big packet and discharges the second packet. Optionally, next, the protection device may discharge a subsequent ICMPv6 Packet Too Big packet from the source node. This procedure ends.

Step a5: The protection device generates a probe packet and sends the probe packet to the source node.

A packet length of the probe packet is greater than the MTU value obtained by the protection device from the first packet, and an authentication field is included in the probe packet.

In this embodiment, a value of the authentication field in the probe packet may be automatically generated by the protection device according to a predetermined algorithm, or may be a preset value. A manner of setting the value of the authentication field in the probe packet is not limited in this embodiment.

Step a6: The protection device determines whether a third packet is received in a preset second time duration, where the third packet is an ICMPv6 Packet Too Big packet. If the third packet is received in the preset second time duration, perform step a7; and if the protection device does not receive the third packet in the preset second time duration, perform step a11.

The preset second time duration may be set during specific implementation. A length of the preset second time duration is not limited in this embodiment. For example, the preset second time duration may be 5 s.

Step a7: The protection device determines whether an authentication field is included in the third packet; if an authentication field is included in the third packet, perform step a8; and if the protection device determines that an authentication field is not included in the third packet, perform step a11.

Step a8: The protection device determines whether a value of the authentication field in the third packet is the same as a value of the authentication field in the probe packet; if the value of the authentication field in the third packet is the same as the value of the authentication field in the probe packet, perform step a9; and if the protection device determines that the value of the authentication field in the third packet is different from the value of the authentication field in the probe packet, perform step a11.

Step a9: The protection device compares the MTU value carried in the first packet and an MTU value carried in the third packet, and determines whether a difference between the MTU value carried in the first packet and the MTU value carried in the third packet is less than a preset threshold; if the difference between the MTU value carried in the first packet and the MTU value carried in the third packet is less than a preset threshold, perform step a10; and if the protection device determines that the difference between the MTU value carried in the first packet and the MTU value carried in the third packet is greater than or equal to the preset threshold, perform step a11.

The preset threshold may be set during specific implementation, and the preset threshold is not limited in this embodiment.

Step a10: The protection device determines that the first packet is a normal ICMPv6 Packet Too Big packet. This procedure ends.

Next, optionally, the protection device may discharge a subsequent ICMPv6 Packet Too Big packet from the source node.

Step a11: The protection device determines that the first packet is an attack ICMPv6 Packet Too Big packet. This procedure ends.

Next, the protection device may perform discard processing for a subsequent ICMPv6 Packet Too Big packet from the source node.

Figure 1C:
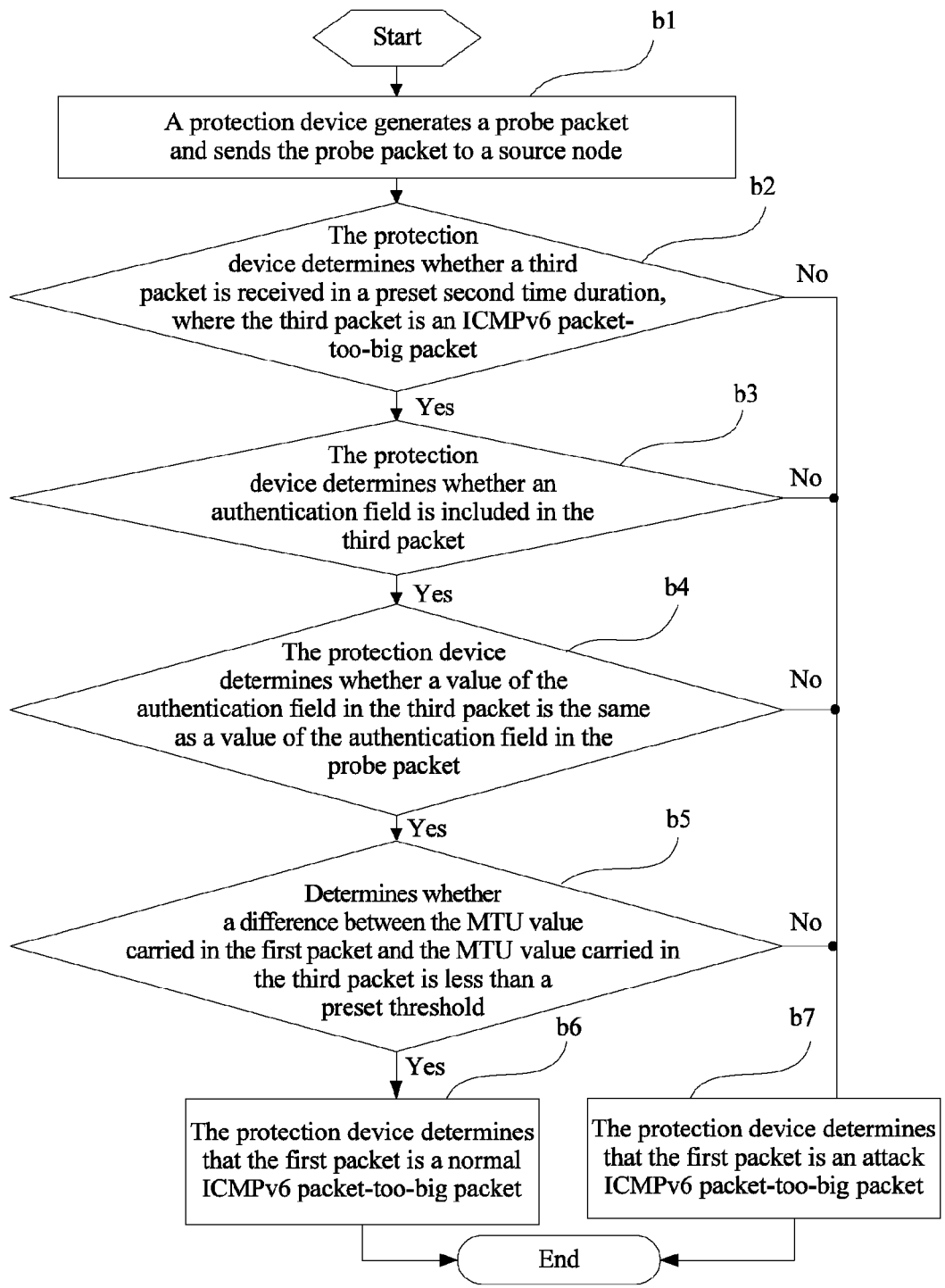
FIG. 1C is a flowchart of a manner of performing attack defense processing by a protection device for an ICMPv6 Packet Too Big packet according to another embodiment of the present disclosure.

FIG. 1C is a flowchart of a manner of performing attack defense processing by a protection device for an ICMPv6 Packet Too Big packet according to another embodiment of the present disclosure. As shown in FIG. 1C, the manner may include Step b1: A protection device generates a probe packet and sends the probe packet to a source node.

A packet length of the probe packet is greater than an MTU value obtained by the protection device acquired from a first packet, and an authentication field is included in the probe packet.

In this embodiment, a value of the authentication field in the probe packet may be a value automatically generated by the protection device according to a preset algorithm, and may also be a preset value. A manner of setting the value of the authentication field in the probe packet is not limited in this embodiment.

Step b2: The protection device determines whether a third packet is received in a preset second time duration, where the third packet is an ICMPv6 Packet Too Big packet; if the third packet is received in the preset second time duration, perform step b3; and if the protection device does not receive the third packet in the preset second time duration, perform step b7.

The preset second time duration may be set during specific implementation. A length of the preset second time duration is not limited in this embodiment. For example, the preset second time duration may be 5 s.

Step b3: The protection device determines whether an authentication field is included in the third packet; if an authentication field is included in the third packet, perform step b4; and if the protection device determines that an authentication field is not included in the third packet, perform step b7.

Step b4: The protection device determines whether a value of the authentication field in the third packet is the same as a value of the authentication field in the probe packet; if the value of the authentication field in the third packet is the same as the value of the authentication field in the probe packet, perform step b5; and if the protection device determines that the value of the authentication field in the third packet is different from the value of the authentication field in the probe packet, perform step b7.

Step b5: The protection device compares the MTU value carried in the first packet and an MTU value carried in the third packet, and determines whether a difference between the MTU value carried in the first packet and the MTU value carried in the third packet is less than a preset threshold; if the difference between the MTU value carried in the first packet and the MTU value carried in the third packet is less than the preset threshold, perform step b6; and if the protection device determines that the difference between the MTU value carried in the first packet and the MTU value carried in the third packet is greater than or equal to the preset threshold, perform step b7.

The preset threshold may be set during specific implementation, and the preset threshold is not limited in this embodiment.

Step b6: The protection device determines that the first packet is a normal ICMPv6 Packet Too Big packet. This procedure ends.

Next, the protection device may discharge the first packet and a subsequent ICMPv6 Packet Too Big packet from the source node.

Step b7: The protection device determines that the first packet is an attack ICMPv6 Packet Too Big packet. This procedure ends.

Next, the protection device may discard the first packet and a subsequent ICMPv6 Packet Too Big packet from the source node.

Further, in this embodiment, after the protection device determines that the first packet is a normal ICMPv6 Packet Too Big packet, the protection device may further update the saved value of the MTU on the path from the source node to the destination node to the MTU value obtained by the protection device from the first packet.

In this embodiment, after step 101, if the protection device determines that the first packet is not an ICMPv6 Packet Too Big packet, and the protection device determines that the first packet is a normal service packet, the protection device parses the first packet to obtain the IP address of the source node and the IP address of the destination node that are carried in the first packet, and determines whether a packet length of the first packet is greater than a saved value of an MTU on a path from the source node and the destination node; if the first packet is a normal service packet, and the packet length of the first packet is greater than the saved value of the MTU on the path from the source node and the destination node, the protection device updates the value of the MTU on the path from the source node to the destination node to the packet length of the first packet.

That the protection device determines that the first packet is a normal service packet may be as follows. The protection device obtains a value of a protocol field that is carried in an IP header of the first packet; and if the value of the protocol field indicates that an upper-layer protocol type encapsulated at an IP layer is a transport protocol such as the TCP or the User Datagram Protocol (UDP), the protection device determines that the first packet is a normal service packet.

In this embodiment, if the protection device determines that the MTU value carried in the first packet belongs to the range of the valid MTUs on the path between the source node and the destination node, the protection device directly discharges the received first packet instead of performing attack defense processing for the received first packet.

In the foregoing embodiment, after a protection device receives a first packet, if it is determined that the first packet is an ICMPv6 Packet Too Big packet, the protection device parses the first packet to obtain an IP address of a source node, an IP address of a destination node, and an MTU value that are carried in the first packet; and if the protection device determines that the MTU value does not belong to a range of valid MTUs on a path between the source node and the destination node, the protection device determines that the first packet is an attack ICMPv6 Packet Too Big packet. Therefore, the protection device performs attack defense processing for the first packet. In this way, a normal ICMPv6 Packet Too Big packet can be distinguished from the attack ICMPv6 Packet Too Big packet on the protection device, thereby implementing protection against a path MTU attack.

Figures 1, 2A:
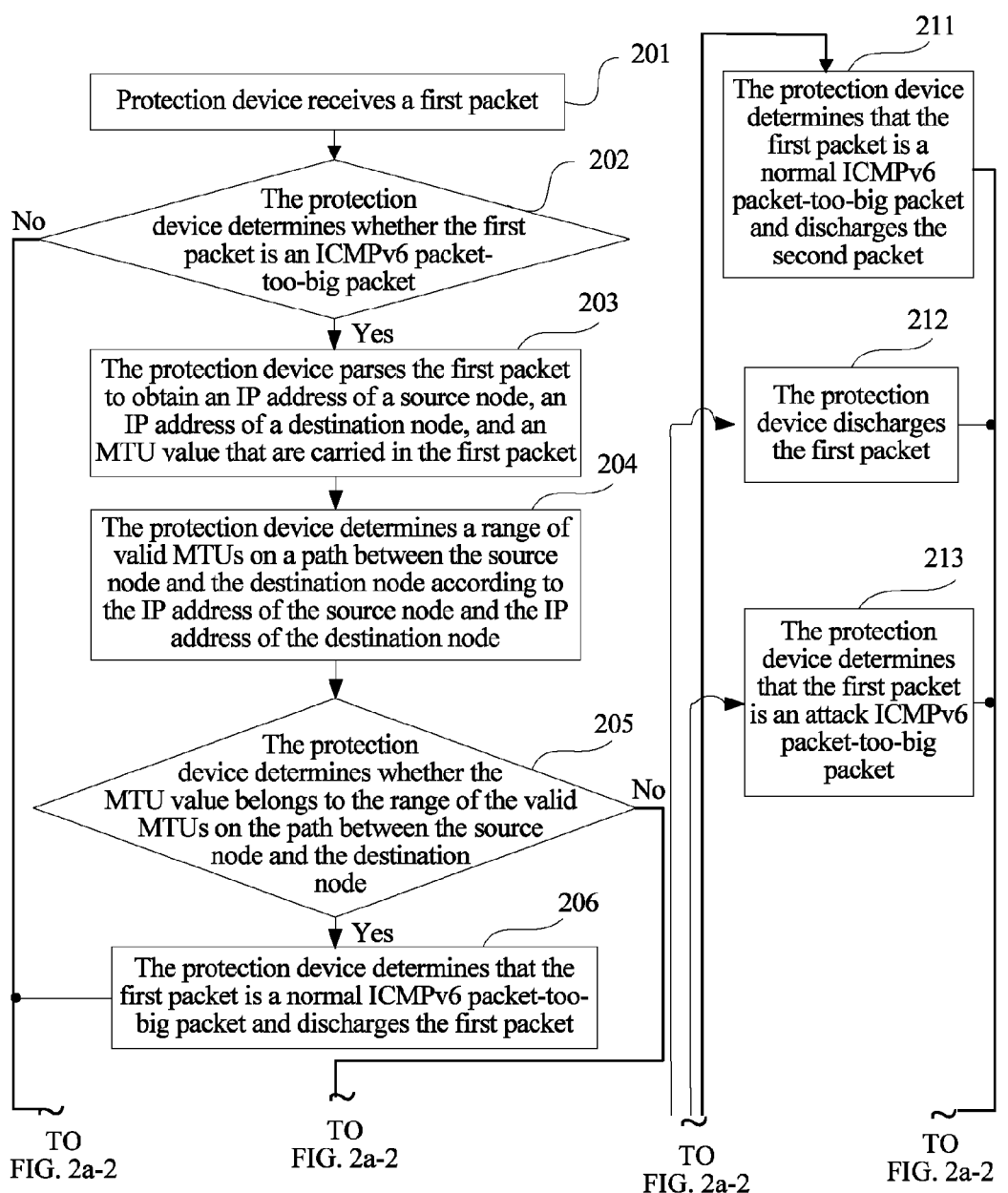
Figures 2, 2A:
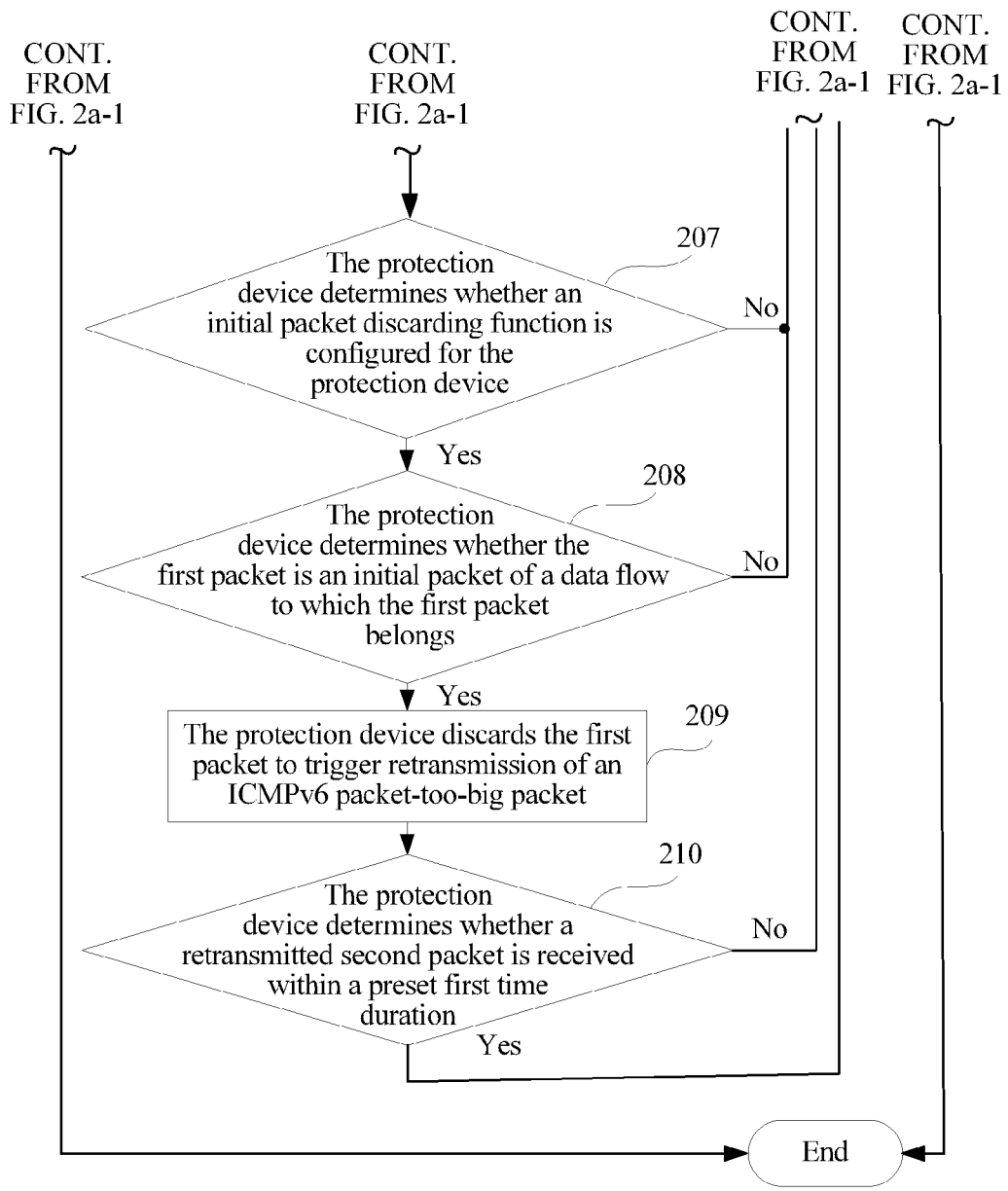

FIG. 2A-1 and FIG. 2A-2 is a flowchart of an attack defense processing method according to another embodiment of the present disclosure. As shown in FIG. 2A-1, the attack defense processing method may include Step 201: A protection device receives a first packet.

Step 202: The protection device determines whether the first packet is an ICMPv6 Packet Too Big packet; if the first packet is an ICMPv6 Packet Too Big packet, perform step 203; and if the protection device determines that the first packet is not an ICMPv6 Packet Too Big packet, end this procedure.

The protection device determines that the first packet is an ICMPv6 Packet Too Big packet as follows. The protection device obtains a value of a protocol field that is carried in an IP header of the first packet; if the value of the protocol field indicates that an upper-layer protocol type encapsulated at an IP layer is ICMPv6, the protection device determines that the packet is an ICMPv6 packet; and further, the protection device obtains a value of an ICMP-type field in a basic header of the ICMPv6 packet and determines that the packet is an ICMPv6 Packet Too Big packet according to the value of the ICMP-type field.

Step 203: The protection device parses the first packet to obtain an IP address of a source node, an IP address of a destination node, and an MTU value that are carried in the first packet.

Step 204: The protection device determines a range of valid MTUs on a path between the source node and the destination node according to the IP address of the source node and the IP address of the destination node.

The protection device determines a range of valid MTUs on a path between the source node and the destination node according to the IP address of the source node and the IP address of the destination node as follows. The protection device obtains, according to the IP address of the source node and the IP address of the destination node, a value of an MTU on a path from the source node to the destination node and a value of an MTU on a path from the destination node to the source node that are saved on the protection device, determines that an upper limit of the range of the valid MTUs on the path between the source node and the destination node is the greater one of the value of the MTU on the path from the source node to the destination node and the value of the MTU on the path from the destination node to the source node, and determines that a lower limit of the range of the valid MTUs on the path between the source node and the destination node is the smaller one of the value of the MTU on the path from the source node to the destination node and the value of the MTU on the path from the destination node to the source node, or, the protection device queries and obtains a path MTU range configured for the path between the source node and the destination node from a saved correspondence between an IP address pair and a path MTU range according to the IP address of the source node and the IP address of the destination node. In this case, the protection device may determine that the upper limit of the range of the valid MTUs on the path between the source node and the destination node is an upper limit of the configured path MTU range, and the lower limit of the range of the valid MTUs on the path between the source node and the destination node is a lower limit of the configured path MTU range. The path MTU range configured for the path between the source node and the destination node may be set during specific implementation, and is not limited herein.

Step 205: The protection device determines whether the MTU value belongs to the range of the valid MTUs on the path between the source node and the destination node; if the MTU value belongs to the range of the valid MTUs on the path between the source node and the destination node, perform step 206; and if the protection device determines that the MTU value does not belong to the range of the valid MTUs on the path between the source node and the destination node, perform step 207.

The protection device determines whether the MTU value belongs to the range of the valid MTUs on the path between the source node and the destination node as follows. The protection device determines whether the MTU value is greater than or equal to the lower limit of the range of the valid MTUs on the path between the source node and the destination node, and is less than or equal to the upper limit of the range of the valid MTUs on the path between the source node and the destination node.

Step 206: The protection device determines that the first packet is a normal ICMPv6 Packet Too Big packet and discharges the first packet. This procedure ends.

Step 207: The protection device determines whether an initial packet discarding function is configured for the protection device.

If the initial packet discarding function is configured for the protection device, perform step 208; and if the protection device determines that the initial packet discarding function is not configured for the protection device, perform step 212.

Step 208: The protection device determines whether the first packet is an initial packet of a data flow to which the first packet belongs; if the first packet is the initial packet of the data flow to which the first packet belongs, perform step 209; and if the protection device determines that the first packet is not the initial packet of the data flow to which the first packet belongs, perform step 212.

Step 209: The protection device discards the first packet to trigger retransmission of an ICMPv6 Packet Too Big packet.

Step 210: The protection device determines whether a retransmitted second packet is received within a preset first time duration, where the second packet is an ICMPv6 Packet Too Big packet; if the retransmitted second packet is received within the preset first time duration, perform step 211; and if the protection device does not receive the retransmitted second packet within the preset first time duration, perform step 213.

The preset first time duration may be set according to system performance and the like during specific implementation. A length of the preset first time duration is not limited in this embodiment. For example, the preset first time duration may be 5 s.

Step 211: The protection device determines that the first packet is a normal ICMPv6 Packet Too Big packet and discharges the second packet. Optionally, next, the protection device may discharge a subsequent ICMPv6 Packet Too Big packet from the source node. This procedure ends.

Step 212: The protection device discharges the first packet. This procedure ends.

Step 213: The protection device determines that the first packet is an attack ICMPv6 Packet Too Big packet. This procedure ends.

Optionally, the protection device may discard a subsequent ICMPv6 Packet Too Big packet from the source node.

The foregoing embodiment may achieve that a normal ICMPv6 Packet Too Big packet is distinguished from an attack ICMPv6 Packet Too Big packet on a protection device to protect against a path MTU attack.

Further, in the embodiment as shown in FIG. 2A-1, after step 206 or step 211, that is, after determining that the first packet is a normal ICMPv6 Packet Too Big packet, the protection device may update the value of the MTU on the path from the source node to the destination node to the MTU value obtained by the protection device from the first packet.

Figures 1, 2B:
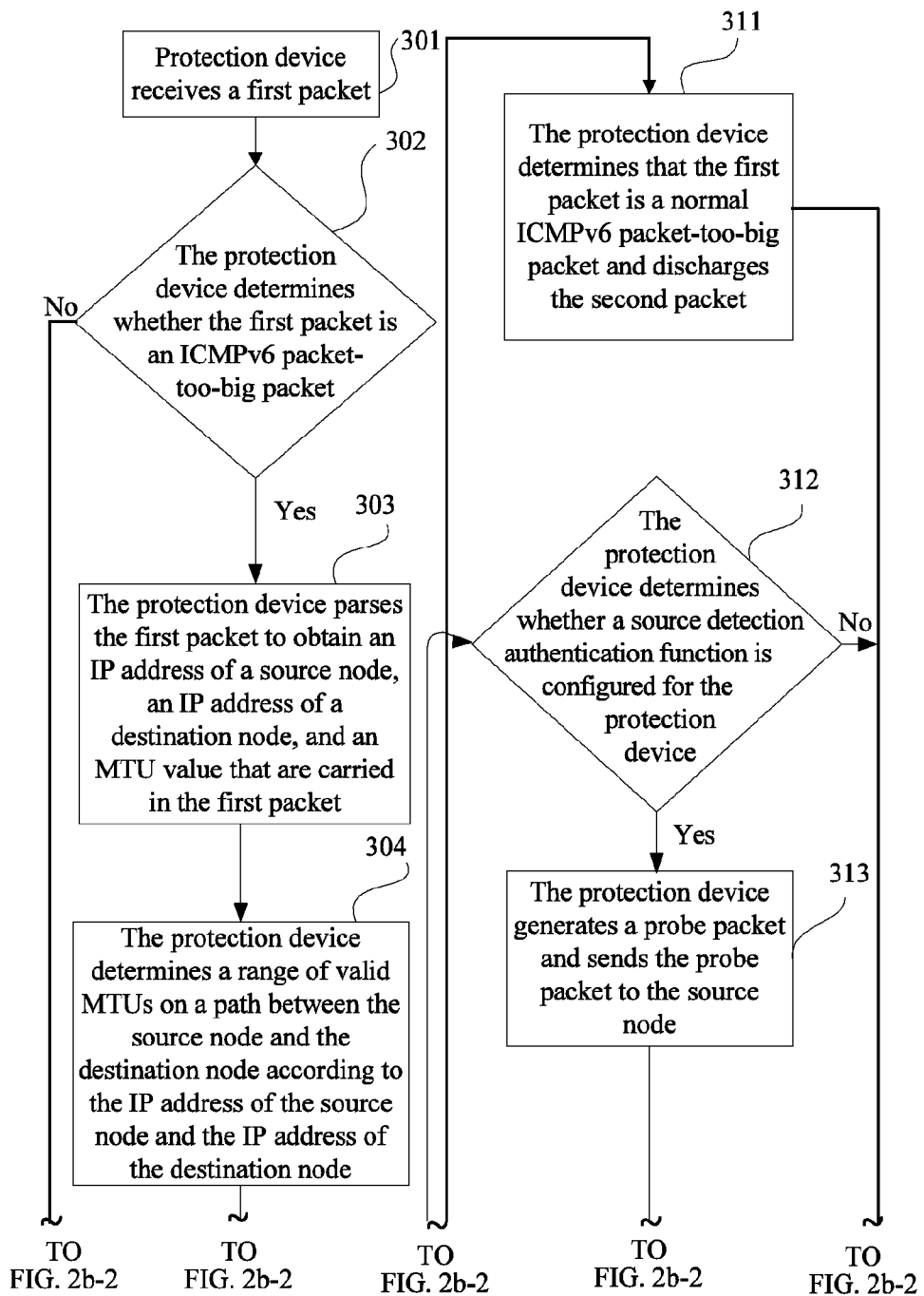
Figures 2, 2B:
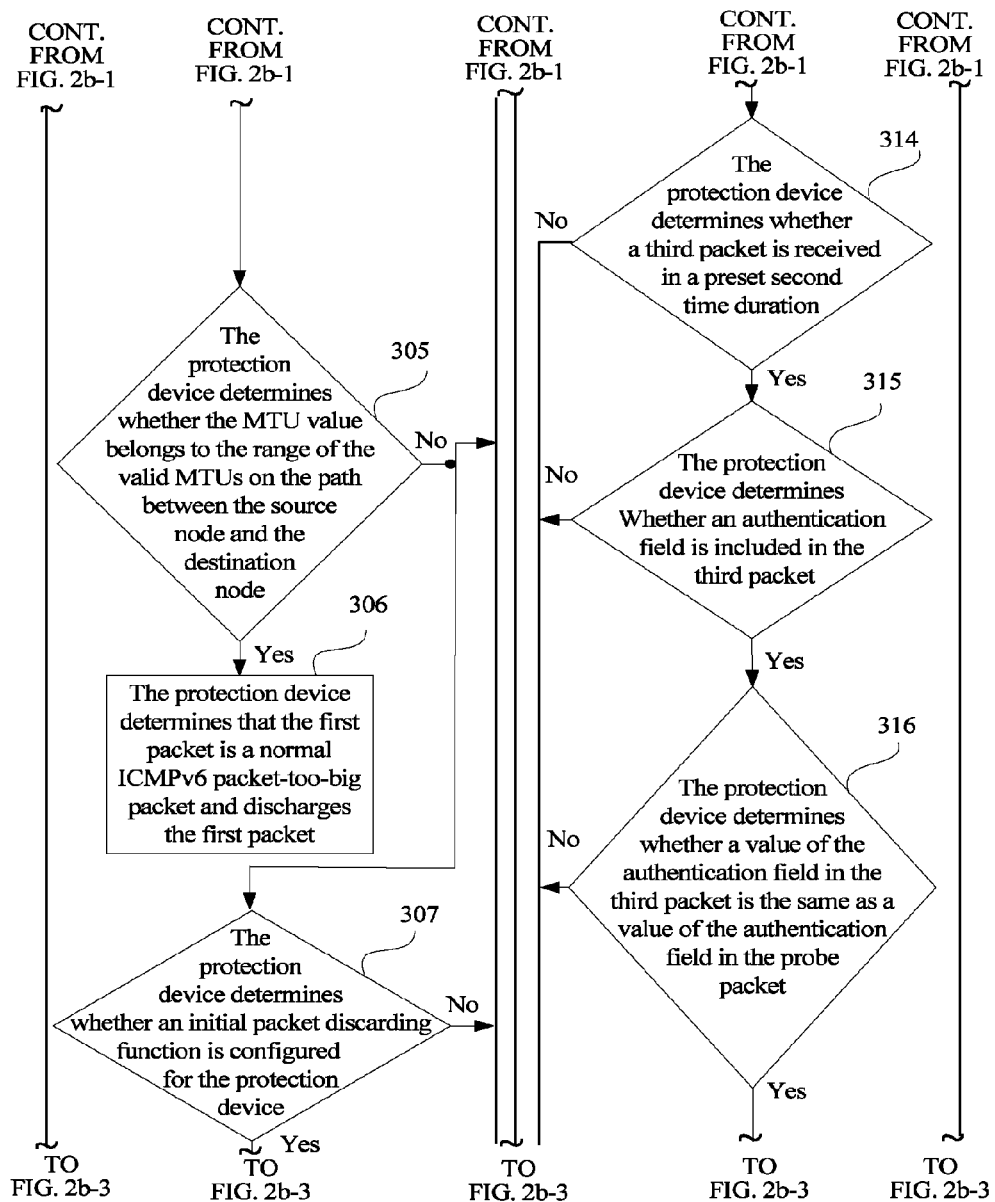

FIG. 2B-1, FIG. 2B-2, and FIG. 2B-3 is a flowchart of an attack defense processing method according to still another embodiment of the present disclosure. As shown in FIG. 2B-1, the attack defense processing method may include Step 301: A protection device receives a first packet.

Step 302: The protection device determines whether the first packet is an ICMPv6 Packet Too Big packet; if the first packet is an ICMPv6 Packet Too Big packet, perform step 303; and if the protection device determines that the first packet is not an ICMPv6 Packet Too Big packet, end this procedure.

Step 303: The protection device parses the first packet to obtain an IP address of a source node, an IP address of a destination node, and an MTU value that are carried in the first packet.

Step 304: The protection device determines a range of valid MTUs on a path between the source node and the destination node according to the IP address of the source node and the IP address of the destination node.

The protection device determining a range of valid MTUs on a path between the source node and the destination node according to the IP address of the source node and the IP address of the destination node may be as follows. The protection device obtains, according to the IP address of the source node and the IP address of the destination node, a value of an MTU on a path from the source node to the destination node and a value of an MTU on a path from the destination node to the source node that are saved on the protection device, determines that an upper limit of the range of the valid MTUs on the path between the source node and the destination node is the greater one of the value of the MTU on the path from the source node to the destination node and the value of the MTU on the path from the destination node to the source node, and determines that a lower limit of the range of the valid MTUs on the path between the source node and the destination node is the smaller one of the value of the MTU on the path from the source node to the destination node and the value of the MTU on the path from the destination node to the source node, or, the protection device queries and obtains a path MTU range configured for the path between the source node and the destination node from a saved correspondence between an IP address pair and a path MTU range according to the IP address of the source node and the IP address of the destination node. In this case, the protection device may determine that the upper limit of the range of the valid MTUs on the path between the source node and the destination node is an upper limit of the configured path MTU range, and the lower limit of the range of the valid MTUs on the path between the source node and the destination node is a lower limit of the configured path MTU range. The path MTU range configured for the path between the source node and the destination node may be set during specific implementation, and is not limited herein.

Step 305: The protection device determines whether the MTU value belongs to the range of the valid MTUs on the path between the source node and the destination node; if the MTU value belongs to the range of the valid MTUs on the path between the source node and the destination node, perform step 306; and if the protection device determines that the MTU value does not belong to the range of the valid MTUs on the path between the source node and the destination node, perform step 307 or step 312.

that the protection device determines whether the MTU value belongs to the range of the valid MTUs on the path between the source node and the destination node may be as follows The protection device determines whether the MTU value is greater than or equal to the lower limit of the range of the valid MTUs on the path between the source node and the destination node, and is less than or equal to the upper limit of the range of the valid MTUs on the path between the source node and the destination node.

Step 306: The protection device determines that the first packet is a normal ICMPv6 Packet Too Big packet and discharges the first packet. This procedure ends.

Step 307: The protection device determines whether an initial packet discarding function is configured for the protection device.

If the initial packet discarding function is configured for the protection device, perform step 308; and if the protection device determines that the initial packet discarding function is not configured for the protection device, perform step 312.

Step 308: The protection device determines whether the first packet is an initial packet of a data flow to which the first packet belongs; if the first packet is the initial packet of the data flow to which the first packet belongs, perform step 309; and if the protection device determines that the first packet is not the initial packet of the data flow to which the first packet belongs, perform step 312.

Step 309: The protection device discards the first packet to trigger retransmission of an ICMPv6 Packet Too Big packet.

Step 310: The protection device determines whether a retransmitted second packet is received within a preset first time duration, where the second packet is an ICMPv6 Packet Too Big packet; if the retransmitted second packet is received within the preset first time duration, perform step 311; and if the protection device does not receive the retransmitted second packet within the preset first time duration, perform step 312.

The preset first time duration may be set according to system performance and the like during specific implementation. A length of the preset first time duration is not limited in this embodiment. For example, the preset first time duration may be 5 s.

Step 311: The protection device determines that the first packet is a normal ICMPv6 Packet Too Big packet and discharges the second packet. Optionally, next, the protection device may discharge a subsequent ICMPv6 Packet Too Big packet from the source node. This procedure ends.

Step 312: The protection device determines whether a source detection authentication function is configured for the protection device.

If the source detection authentication function is configured for the protection device, perform step 313; and if the protection device determines that the source detection authentication function is not configured for the protection device, end this procedure.

It should be noted that when the protection device determines that the initial packet discarding function is not configured for the protection device in step 307, and the protection device determines that the source detection authentication function is not configured for the protection device in step 312, the protection device discharges the first packet, and this procedure ends; or, when the protection device determines that the first packet is not the initial packet of the data flow to which the first packet belongs in step 308, and the protection device determines that the source detection authentication function is not configured for the protection device in step 312, the protection device discharges the first packet, and this procedure ends; or, when the protection device does not receive the retransmitted second packet within the preset first time duration in step 310, and the protection device determines that the source detection authentication function is not configured for the protection device in step 312, the protection device determines that the first packet is an attack ICMPv6 Packet Too Big packet and discards the second packet and a subsequent ICMPv6 Packet Too Big packet from the source node, and this procedure ends.

Step 313: The protection device generates a probe packet and sends the probe packet to the source node.

A packet length of the probe packet length is greater than the MTU value obtained by the protection device from the ICMPv6 Packet Too Big packet, and an authentication field is included in the probe packet.

In this embodiment, a value of the authentication field in the probe packet may be a value automatically generated by the protection device according to a preset algorithm, and may also be a preset value. A manner of setting the value of the authentication field in the probe packet is not limited in this embodiment.

Step 314: The protection device determines whether a third packet is received in a preset second time duration; if the third packet is not received in the preset second time duration, perform step 319; and if the protection device determines that the third packet is received in the preset second time duration, perform step 315.

The preset second time duration may be set during specific implementation. A length of the preset second time duration is not limited in this embodiment. For example, the preset second time duration may be 5 s.

Step 315: The protection device determines whether an authentication field is included in the third packet.

If an authentication field is included in the third packet, perform step 316; and if the protection device determines that an authentication field is not included in the third packet, perform step 319.

Step 316: The protection device determines whether a value of the authentication field in the third packet is the same as a value of the authentication field in the probe packet.

If the value of the authentication field in the third packet is the same as the value of the authentication field in the probe packet, perform step 317; and if the protection device determines that the value of the authentication field in the third packet is different from the value of the authentication field in the probe packet, perform step 319.

Step 317: The protection device determines whether a difference between the MTU value carried in the first packet and an MTU value carried in the third packet is less than a preset threshold; if the difference between the MTU value carried in the first packet and the MTU value carried in the third packet is less than the preset threshold, perform step 318; and if the protection device determines that the difference between the MTU value carried in the first packet and the MTU value carried in the third packet is greater than or equal to the preset threshold, perform step 319.

The preset threshold may be set during specific implementation, and the preset threshold is not limited in this embodiment.

Step 318: The protection device determines that the first packet is a normal ICMPv6 Packet Too Big packet. This procedure ends.

Next, the protection device may discharge the first packet and a subsequent ICMPv6 Packet Too Big packet from the source node.

Step 319: The protection device determines that the first packet is an attack ICMPv6 Packet Too Big packet. This procedure ends.

Next, the protection device may discard the first packet and a subsequent ICMPv6 Packet Too Big packet from the source node.

The foregoing embodiment may achieve that a normal ICMPv6 Packet Too Big packet is distinguished from an attack ICMPv6 Packet Too Big packet on a protection device to protect against a path MTU attack.

Further, in the embodiment shown in FIG. 2B-1, FIG. 2B-2, and FIG. 2B-3, after step 306 or step 318, that is, after determining that the first packet is a normal ICMPv6 Packet Too Big packet, the protection device may update the value of the MTU on the path from the source node to the destination node to the MTU value obtained by the protection device from the first packet.

In addition, in the embodiments shown in FIG. 2A-1, FIG. 2A-2 FIG. 2B-1, FIG. 2B-2, and FIG. 2B-3, after the protection device receives the first packet, if the protection device determines that the first packet is not an ICMPv6 Packet Too Big packet, and the protection device determines that the first packet is a normal service packet, the protection device parses the first packet to obtain the IP address of the source node and the IP address of the destination node that are carried in the first packet, and determines whether a packet length of the first packet is greater than the value of the MTU on the path from the source node to the destination node; and if the packet length of the first packet is greater than the value of the MTU on the path from the source node to the destination node, the protection device updates the value of the MTU on the path from the source node to the destination node to the packet length of the first packet. In this way, the protection device may implement learning of the value of the MTU on the path from the source node to the destination node by monitoring the packet, to take the MTU value as a reference for determining whether a received ICMPv6 Packet Too Big packet is an attack ICMPv6 Packet Too Big packet. That the protection device determines that the first packet is a normal service packet may be as follows. The protection device obtains a value of a protocol field that is carried in an IP header of the first packet; and if the value of the protocol field indicates that an upper-layer protocol type encapsulated at an IP layer is TCP, UDP, or another transport protocol, the protection device determines that the first packet is a normal service packet.

Figures 2, 2B, 3:
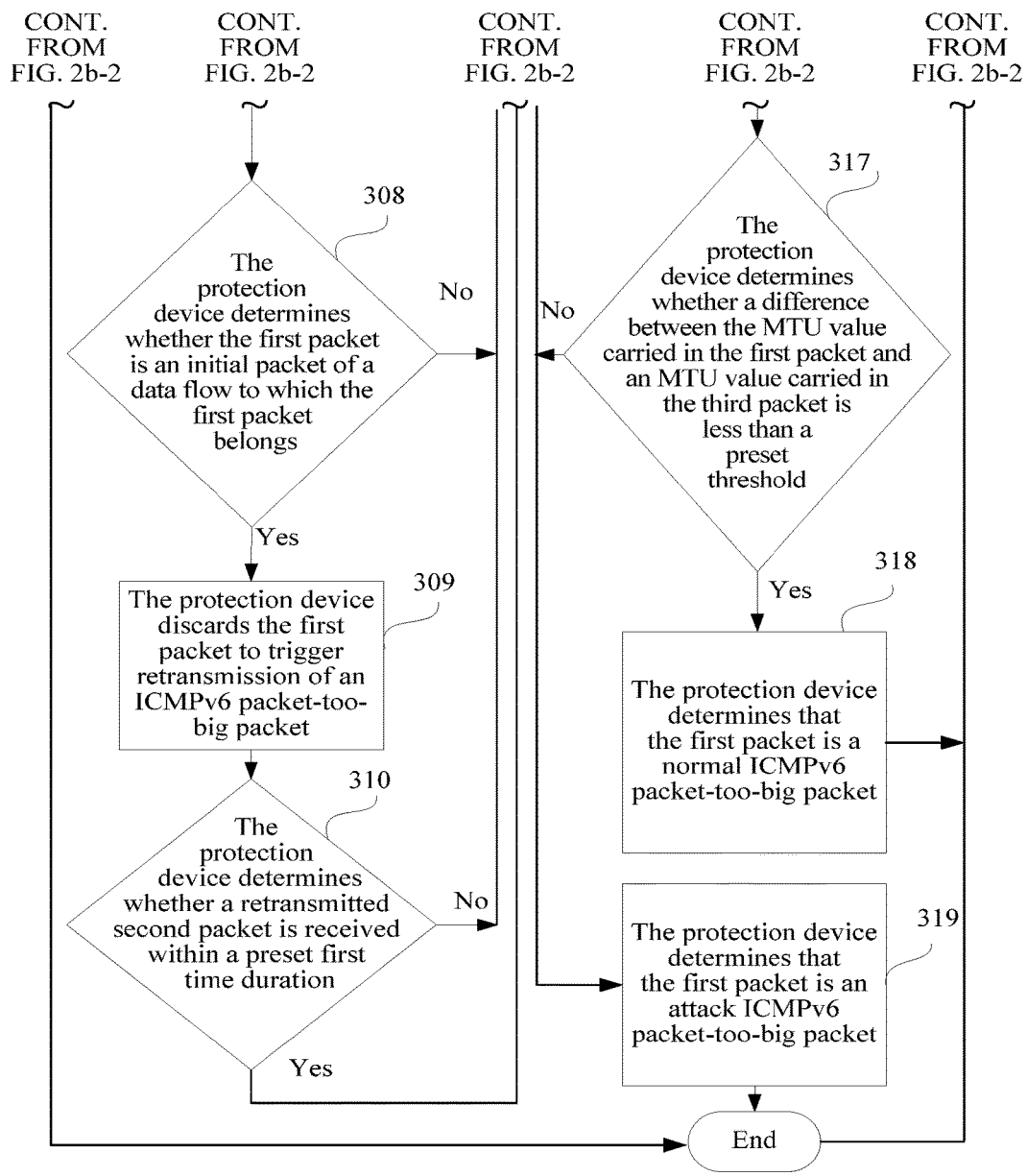
Figure 3:
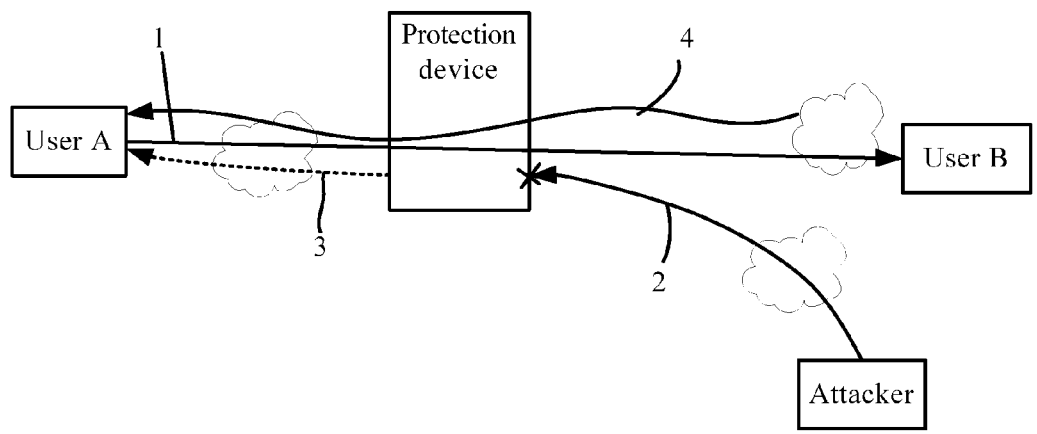

The methods provided in the embodiments shown in FIG. 1A, FIG. 1B-1, FIG. 1B-2, FIG. 1C, FIG. 2A-1 and FIG. 2A-2, and FIG. 2B-1, FIG. 2B-2, and FIG. 2B-3 of the present disclosure may be applicable to a scenario shown in FIG. 3. FIG. 3 is a schematic diagram of an application scenario according to an embodiment of the present disclosure. In FIG. 3, user A sends a normal IPv6 service packet to user B, as indicated by line 1 in FIG. 3; an attacker sends an attack ICMPv6 Packet Too Big packet to user A and launches a path MTU attack on user A, as indicated by line 2 in FIG. 3. If the protection device enables path MTU attack defense, the protection device discards the attack ICMPv6 Packet Too Big packet sent by the attacker by using the methods provided in the embodiments shown in FIG. 1A, FIG. 1B-1 and FIG. 1B-2, FIG. 1C, FIG. 2A-1 and FIG. 2A-2, and FIG. 2B-1, FIG. 2B-2, and FIG. 2B-3.

If the protection device disables path MTU attack defense, the attack ICMPv6 Packet Too Big packet may arrive at user A all the way, as indicated by line 3 in FIG. 3.

For the normal ICMPv6 Packet Too Big packet sent to user A on the network, the protection device performs path MTU attack defense by using the methods provided in the embodiments shown in FIG. 1A, FIG. 1B-1 and FIG. 1B-2, FIG. 1C, FIG. 2A-1 and FIG. 2A-2, and FIG. 2B-1, FIG. 2B-2, and FIG. 2B-3 in the present disclosure, and the normal ICMPv6 Packet Too Big packet is allowed to pass. That is, the normal ICMPv6 Packet Too Big packet sent to user A on the network is capable of arriving at user A by using the protection device, as indicated by line 4 in FIG. 3.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random access memory (RAM), a magnetic disk, or an optical disc.

Figure 4:
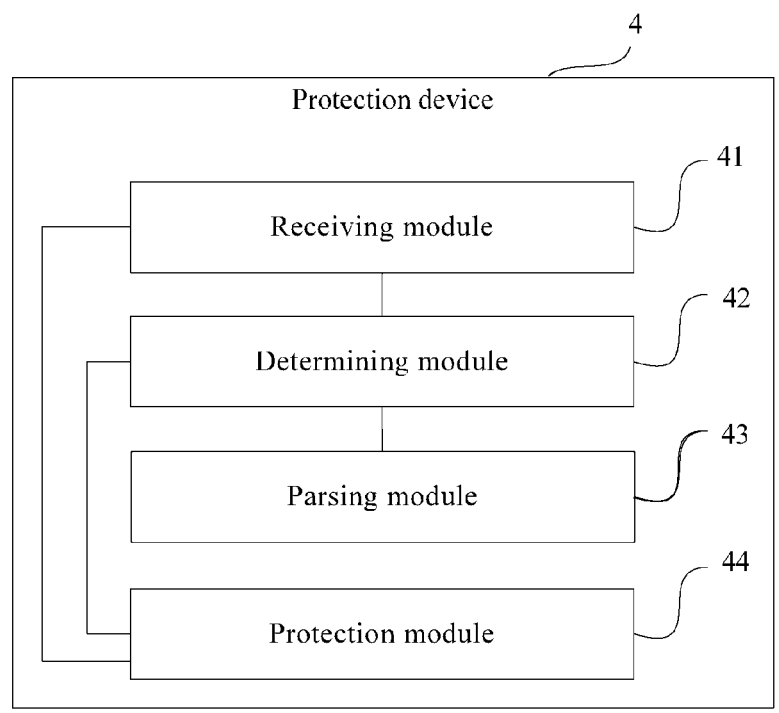
FIG. 4 is a schematic structural diagram of a protection device according to an embodiment of the present disclosure.

FIG. 4 is a schematic structural diagram of a protection device according to an embodiment of the present disclosure. A protection device 4 in this embodiment can implement the procedure of the embodiment of the present disclosure shown in FIG. 1A, FIG. 1B-1, FIG. 1B-2, or FIG. 1C. As shown in FIG. 4, the protection device 4 may include a receiving module 41, a determining module 42, a parsing module 43, and a protection module 44, where the receiving module 41 is configured to receive a first packet, the determining module 42 is configured to determine whether the first packet received by the receiving module 41 is an ICMPv6 Packet Too Big packet, the parsing module 43 is configured to, when the determining module 42 determines that the first packet received by the receiving module 41 is an ICMPv6 Packet Too Big packet, parse the first packet to obtain an IP address of a source node, an IP address of a destination node, and an MTU value that are carried in the first packet, the determining module 42 is further configured to determine a range of valid MTUs on a path between the source node and the destination node according to the IP address of the source node and the IP address of the destination node that are obtained by the parsing module 43, and determine whether the MTU value obtained by the parsing module 43 belongs to the range of the valid MTUs on the path between the source node and the destination node, and the protection module 44 is configured to, when the determining module 42 determines that the MTU value obtained by the parsing module 43 does not belong to the range of the valid MTUs on the path between the source node and the destination node, perform attack defense processing for the first packet received by the receiving module 41.

In this embodiment, that the determining module 42 is configured to determine a range of valid MTUs on a path between the source node and the destination node according to the IP address of the source node and the IP address of the destination node that are obtained by the parsing module 43 may be as follows. The determining module 42 is configured to obtain, according to the IP address of the source node and the IP address of the destination node, a value of an MTU on a path from the source node to the destination node and a value of an MTU on a path from the destination node to the source node that are saved on the protection device; determine that an upper limit of the range of the valid MTUs on the path between the source node and the destination node is the greater one of the value of the MTU on the path from the source node to the destination node and the value of the MTU on the path from the destination node to the source node; and determine that a lower limit of the range of the valid MTUs on the path between the source node and the destination node is the smaller one of the value of the MTU on the path from the source node to the destination node and the value of the MTU on the path from the destination node to the source node, or, the determining module 42 is configured to query and obtain a path MTU range configured for the path between the source node and the destination node from a saved correspondence between an IP address pair and a path MTU scope according to the IP address of the source node and the IP address of the destination node. In this case, the determining module 42 may determine the upper limit of the range of the valid MTUs on the path between the source node and the destination node is an upper limit of the configured path MTU range, and the lower limit of the range of the valid MTUs on the path between the source node and the destination node is a lower limit of the configured path MTU range. The path MTU range configured for the path between the source node and the destination node may be set during specific implementation, and is not limited herein.

Therefore, that the determining module 42 determines whether the MTU value obtained by the parsing module 43 belongs to the range of the valid MTUs on the path between the source node and the destination node may be as follows. The determining module 42 determines whether the MTU value is greater than or equal to the lower limit of the range of the valid MTUs on the path between the source node and the destination node, and less than or equal to the upper limit of the range of the valid MTUs on the path between the source node and the destination node.

In the foregoing embodiment, after the receiving module 41 receives a first packet, if the determining module 42 determines that the first packet is an ICMPv6 Packet Too Big packet, the parsing module 43 parses the first packet to obtain an IP address of a source node, an IP address of a destination node, and an MTU value that are carried in the first packet; if the determining module 42 determines that the MTU value does not belong to a range of valid MTUs on a path between the source node and the destination node, it is determined that the first packet is an attack ICMPv6 Packet Too Big packet, and the protection module 44 performs attack defense processing for the first packet. Therefore, a normal ICMPv6 Packet Too Big packet can be distinguished from the attack ICMPv6 Packet Too Big packet on the protection device, thereby implementing protection against a path MTU attack.

Figure 5:
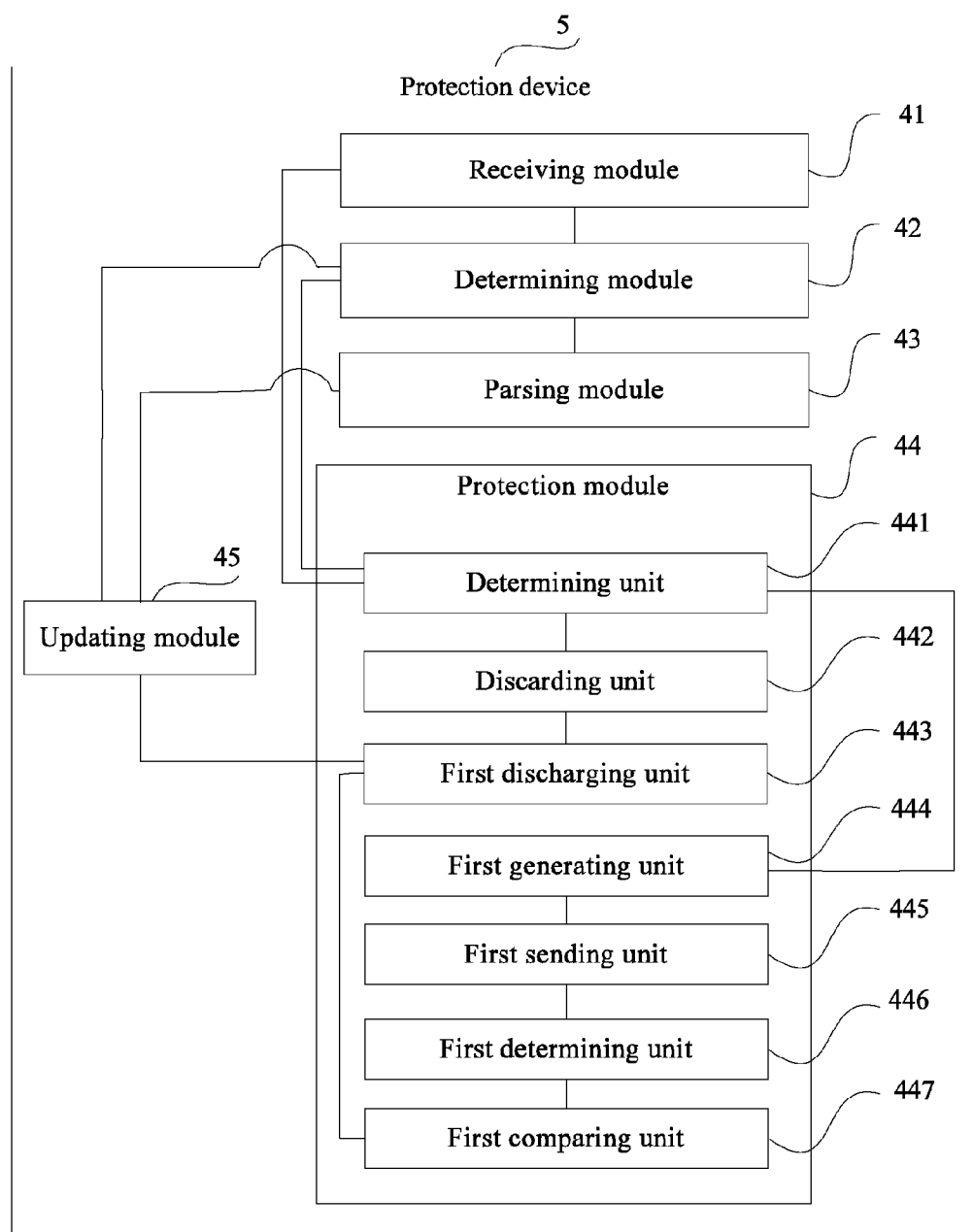
FIG. 5 is a schematic structural diagram of a protection device according to another embodiment of the present disclosure.

FIG. 5 is a schematic structural diagram of a protection device according to another embodiment of the present disclosure. Compared with the protection device 4 shown in FIG. 4, a difference lies in that a protection module 44 in a protection device 5 shown in FIG. 5 may include a determining unit 441, a discarding unit 442, and a first discharging unit 443, where the determining unit 441 is configured to determine whether a first packet received by a receiving module 41 is an initial packet of a data flow to which the first packet belongs, the discarding unit 442 is configured to discard the first packet to trigger retransmission of an ICMPv6 Packet Too Big packet when the determining unit 441 determines that the first packet is the initial packet of the data flow to which the first packet belongs, and the first discharging unit 443 is configured to, when a retransmitted second packet is received within a preset first time duration, and the second packet is an ICMPv6 Packet Too Big packet, determine that the first packet is a normal ICMPv6 Packet Too Big packet and discharge the second packet. Next, the first discharging unit 443 may discharge a subsequent ICMPv6 Packet Too Big packet from the source node.

Further, the protection module 44 may further include a first generating unit 444, a first sending unit 445, a first determining unit 446, and a first comparing unit 447, where the first generating unit 444 is configured to generate a probe packet when the determining unit 441 determines that the first packet is not the initial packet of the data flow to which the first packet belongs or the retransmitted second packet is not received within the preset first time duration, where a packet length of the probe packet is greater than the MTU value obtained by the parsing module 43 from the first packet, and an authentication field is included in the probe packet, the first sending unit 445 is configured to send the probe packet generated by the first generating unit 444 to the source node, the first determining unit 446 is configured to, when a third packet is received within a preset second time duration, and the third packet is an ICMPv6 Packet Too Big packet, determine whether an authentication field is included in the third packet; and when an authentication field is included in the third packet, determine whether a value of the authentication field in the third packet is the same as a value of the authentication field in the probe packet, the first comparing unit 447 is configured to, when the first determining unit 446 determines that the value of the authentication field in the third packet is the same as the value of the authentication field in the probe packet, compare the MTU value carried in the first packet and an MTU value carried in the third packet, and the first discharging unit 443 is further configured to determine that the first packet is a normal ICMPv6 Packet Too Big packet when the first comparing unit 447 determines that a difference between the MTU value carried in the first packet and the MTU value carried in the third packet is less than a preset threshold. Next, the first discharging unit 443 may discharge a subsequent ICMPv6 Packet Too Big packet from the source node.

Further, in an implementation manner of this embodiment, the protection device 5 may further include an updating module 45, where the updating module 45 is configured to, after it is determined that the first packet is a normal ICMPv6 Packet Too Big packet, update the saved value of the MTU on the path from the source node to the destination node to the MTU value obtained by the parsing module 43 from the first packet.

In another implementation manner of this embodiment, the protection device 5 may further include an updating module 45, where the parsing module 43 is further configured to, when the determining module 42 determines that the first packet is not an ICMPv6 Packet Too Big packet, and the determining module 42 determines that the first packet is a normal service packet, parse the first packet to obtain the IP address of the source node and the IP address of the destination node that are carried in the first packet, the determining module 42 is further configured to determine whether a packet length of the first packet is greater than the saved value of the MTU on the path from the source node to the destination node, and the updating module 45 is configured to, when the determining module 42 determines that the first packet is a normal service packet, and the packet length of the first packet is greater than the saved value of the MTU on the path from the source node to the destination node, update the value of the MTU on the path from the source node to the destination node to the packet length of the first packet.

The foregoing protection device may achieve that a normal ICMPv6 Packet Too Big packet can be distinguished from an attack ICMPv6 Packet Too Big packet on the protection device, thereby implementing protection against a path MTU attack.

Figure 6:
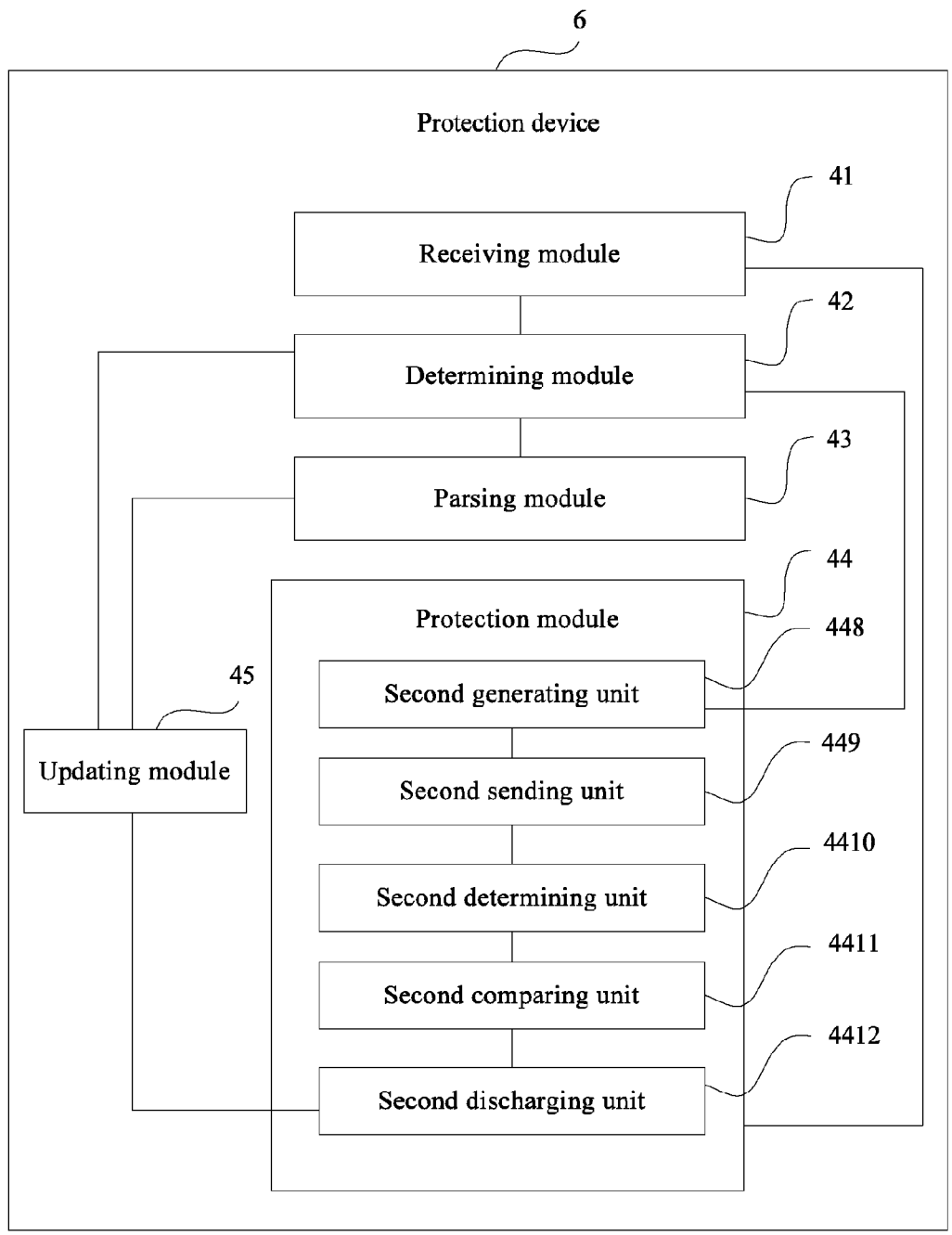
FIG. 6 is a schematic structural diagram of a protection device according to still another embodiment of the present disclosure.

FIG. 6 is a schematic structural diagram of a protection device according to still another embodiment of the present disclosure. Compared with the protection device 4 shown in FIG. 4, a difference lies in that a protection module 44 in a protection device 6 shown in FIG. 6 may include a second generating unit 448, a second sending unit 449, a second determining unit 4410, a second comparing unit 4411, and a second discharging unit 4412, where the second generating unit 448 is configured to generate a probe packet, where a packet length of the probe packet is greater than the MTU value obtained by the parsing module 43 from the first packet, and an authentication field is included in the probe packet, the second sending unit 449 is configured to send the probe packet generated by the second generating unit 448 to the source node, the second determining unit 4410 is configured to, when a third packet is received within a preset second time duration, and the third packet is an ICMPv6 Packet Too Big packet, determine whether an authentication field is included in the third packet; and when an authentication field is included in the third packet, determine whether a value of the authentication field in the third packet is the same as a value of the authentication field in the probe packet, the second comparing unit 4411 is configured to, when the second determining unit 4410 determines that the value of the authentication field in the third packet is the same as the value of the authentication field in the probe packet, compare the MTU value carried in the first packet and an MTU value carried in the third packet, and the second discharging unit 4412 is configured to determine that the first packet is a normal ICMPv6 Packet Too Big packet when the second comparing unit 4411 determines that a difference between the MTU value carried in the first packet and the MTU value carried in the third packet is less than a preset threshold; next, the second discharging unit 4412 can discharge a subsequent ICMPv6 Packet Too Big packet from the source node.

Further, in an implementation manner of this embodiment, the protection device 5 may further include: an updating module 45, where the updating module 45 is configured to, after it is determined that the first packet is a normal ICMPv6 Packet Too Big packet, update the saved value of the MTU on the path from the source node to the destination node to the MTU value obtained by the parsing module 43 from the first packet.

In another implementation manner of this embodiment, the protection device 5 may further include an updating module 45, where the parsing module 43 is further configured to, when the determining module 42 determines that the first packet is not an ICMPv6 Packet Too Big packet, and the determining module 42 determines that the first packet is a normal service packet, parse the first packet to obtain the IP address of the source node and the IP address of the destination node that are carried in the first packet, the determining module 42 is further configured to determine whether a packet length of the first packet is greater than the saved value of the MTU on the path from the source node to the destination node; and, the updating module 45 is configured to, when the determining module 42 determines that the first packet is a normal service packet, and the packet length of the first packet is greater than the saved value of the MTU on the path from the source node to the destination node, update the value of the MTU on the path from the source node to the destination node to the packet length of the first packet.

The foregoing protection device may achieve that a normal ICMPv6 Packet Too Big packet can be distinguished from an attack ICMPv6 Packet Too Big packet on the protection device, thereby implementing protection against a path MTU attack.

Figure 7:
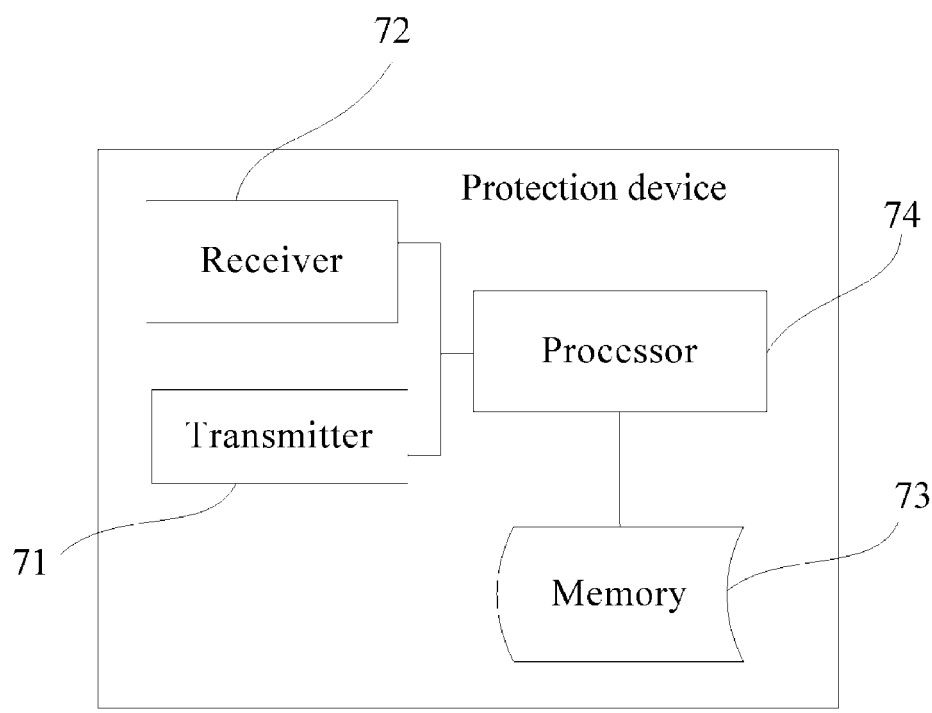
FIG. 7 is a schematic structural diagram of a protection device according to yet another embodiment of the present disclosure.

FIG. 7 is a schematic structural diagram of a protection device according to yet another embodiment of the present disclosure. The protection device in this embodiment can implement the procedure of the embodiment of the present disclosure shown in FIG. 1. As shown in FIG. 7, the protection device may include a transmitter 71, a receiver 72, a memory 73, and a processor 74 separately connected to the transmitter 71, the receiver 72, and the memory 73. Certainly, optionally, the protection device may further include general parts such as a bus and/or an input and output apparatus. This is not limited in this embodiment herein.

The receiver 72 is configured to receive a first packet, the memory 73 is configured to store program code, and the processor 74 is configured to call and perform the program code stored in the memory 73 to implement the following functions. When it is determined that the first packet received by the receiver 72 is an ICMPv6 Packet Too Big packet, parsing the first packet to obtain an IP address of a source node, an IP address of a destination node, and an MTU value that are carried in the first packet; determining a range of valid MTUs on a path between the source node and the destination node according to the IP address of the source node and the IP address of the destination node; and performing attack defense processing for the first packet when it is determined that the MTU value does not belong to the range of the valid MTUs on the path between the source node and the destination node.

In this embodiment, that the processor 74 is configured to determine the range of the valid MTUs on the path between the source node and the destination node according to the IP address of the source node and the IP address of the destination node may be as follows. The processor 74 is configured to obtain, according to the IP address of the source node and the IP address of the destination node, a value of an MTU on a path from the source node to the destination node and a value of an MTU on a path from the destination node to the source node that are saved on the protection device, determine that an upper limit of the range of the valid MTUs on the path between the source node and the destination node is the greater one of the value of the MTU on the path from the source node to the destination node and the value of the MTU on the path from the destination node to the source node, and determine that a lower limit of the range of the valid MTUs on the path between the source node and the destination node is the smaller one of the value of the MTU on the path from the source node to the destination node and the value of the MTU on the path from the destination node to the source node, or, the processor 74 is configured to query and obtain a path MTU range configured for the path between the source node and the destination node from a saved correspondence between an IP address pair and a path MTU range according to the IP address of the source node and the IP address of the destination node. In this case, the processor 74 may determine that the upper limit of the range of the valid MTUs on the path between the source node and the destination node is an upper limit of the configured path MTU range, and the lower limit of the range of the valid MTUs on the path between the source node and the destination node is a lower limit of the configured path MTU range. The path MTU range configured for the path between the source node and the destination node may be set during specific implementation, and is not limited herein.

That the processor 74 determines that the MTU value does not belong to the range of the valid MTUs on the path between the source node and the destination node may be as follows: the processor 74 determines that the MTU value is less than the lower limit of the range of the MTUs on the path between the source node and the destination node, or is greater than the upper limit of the range of the valid MTUs on the path between the source node and the destination node.

In an implementation manner of this embodiment, that the processor 74 is configured to perform attack defense processing for the first packet may be as follows. The processor 74 is configured to discard the first packet to trigger retransmission of an ICMPv6 Packet Too Big packet when it is determined that the first packet is an initial packet of a data flow to which the first packet belongs; and determine that the first packet is a normal ICMPv6 Packet Too Big packet if the receiver 72 receives a retransmitted second packet within a preset first time duration, and the second packet is a ICMPv6 Packet Too Big packet. Next, the processor 74 may discharge a subsequent ICMPv6 Packet Too Big packet from the source node.

Further, the processor 74 is further configured to, when it is determined that the first packet is not the initial packet of the data flow to which the first packet belongs, or the receiver 72 does not receive the retransmitted second packet within the preset first time duration, generate a probe packet, where a packet length of the probe packet is greater than the MTU value obtained by the processor 74 from the first packet, and an authentication field is included in the probe packet; after the transmitter 71 sends the probe packet to the source node, when the receiver 72 receives a third packet within a preset second time duration, and the third packet is an ICMPv6 Packet Too Big packet, determine whether an authentication field is included in the third packet; if an authentication field is included in the third packet, determine whether a value of the authentication field in the third packet is the same as a value of the authentication field in the probe packet; if the value of the authentication field in the third packet is the same as the value of the authentication field in the probe packet, compare the MTU value carried in the first packet and an MTU value carried in the third packet, where the first packet and the third packet are received by the receiver 72; if a difference between the MTU value carried in the first packet and the MTU value carried in the third packet is less than a preset threshold, determine that the first packet is a normal ICMPv6 Packet Too Big packet; and next, the processor 74 may discharge a subsequent ICMPv6 Packet Too Big packet from the source node, and the transmitter 71 is configured to send the probe packet generated by the processor 74 to the source node.

In another implementation manner of this embodiment, that the processor 74 is configured to perform attack defense processing for the first packet may be as follows: the processor 74 is configured to generate a probe packet, where a packet length of the probe packet is greater than the MTU value obtained by the processor 74 from the first packet, and after the transmitter 71 sends the probe packet to the source node, when the receiver 72 receives a third packet within a preset second time duration, and the third packet is an ICMPv6 Packet Too Big packet, determine whether an authentication field is included in the third packet; if an authentication field is included in the third packet, determine whether a value of the authentication field in the third packet is the same as a value of the authentication field in the probe packet; if the value of the authentication field in the third packet is the same as the value of the authentication field in the probe packet, compare the MTU value carried in the first packet and an MTU value carried in the third packet, where the first packet and the third packet are received by the receiver 72; if a difference between the MTU value carried in the first packet and the MTU value carried in the third packet is less than a preset threshold, determine that the first packet is a normal ICMPv6 Packet Too Big packet; and next, the processor 74 may discharge a subsequent ICMPv6 Packet Too Big packet from the source node, and the transmitter 71 is configured to send the probe packet generated by the processor 74 to the source node.

Further, the processor 74 is further configured to update the value of the MTU on the path from the source node to the destination node to the MTU value obtained by the processor 74 from the first packet after it is determined that the first packet is a normal ICMPv6 Packet Too Big packet.

In this embodiment, the processor 74 is further configured to, when it is determined that the first packet received by the receiver 72 is not an ICMPv6 Packet Too Big packet, and it is determined that the first packet received by the receiver 72 is a normal service packet, parse the first packet to obtain the IP address of the source node and the IP address of the destination node that are carried in the first packet, and determine whether a packet length of the first packet is greater than the value of the MTU on the path from the source node to the destination node; and if the packet length of the first packet is greater than the value of the MTU on the path from the source node to the destination node, update the value of the MTU on the path from the source node to the destination node to the packet length of the first packet.

In the foregoing embodiment, after the receiver 72 receives a first packet, if the processor 74 determines that the first packet is an ICMPv6 Packet Too Big packet, the processor 74 parses the first packet to obtain an IP address of a source node, an IP address of a destination node, and an MTU value that are carried in the first packet; if the processor 74 determines that the MTU value does not belong to a range of valid MTUs on a path between the source node and the destination node, it is determined that the first packet is an attack ICMPv6 Packet Too Big packet, and attack defense processing is performed for the first packet. Therefore, a normal ICMPv6 Packet Too Big packet can be distinguished from an attack ICMPv6 Packet Too Big packet on a protection device, thereby implementing protection against a path MTU attack.

Persons skilled in the art may understand that the accompanying drawings are only a schematic diagram of a preferred embodiment, and a module or a procedure in the accompanying drawings may not be required for implementing the present disclosure.

Persons skilled in the art may understand that modules in an apparatus in the embodiments may be distributed on the apparatus in the embodiments according to the description of the embodiments, and may also be changed correspondingly to be arranged on one or a plurality of apparatuses different from those in this embodiment. The modules in the foregoing embodiments may be merged into one module, and may further be divided into a plurality of submodules.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. An attack defense processing method, comprising:
   receiving, by a protection device, a first packet;
   determining, by the protection device, whether the first packet is an Internet Control Message Protocol version 6 (ICMPv6) Packet Too Big packet according to a value of an ICMP-type field in the first packet;
   parsing, by the protection device, the first packet to obtain an Internet Protocol (IP) address of a source node, an IP address of a destination node, and a maximum transmission unit (MTU) value in the first packet when the first packet is the ICMPv6 Packet Too Big packet;
   determining, by the protection device, a range of valid MTU values on a path between the source node and the destination node according to the IP address of the source node and the IP address of the destination node; and
   performing, by the protection device, attack defense processing for the first packet when the MTU value does not belong to the range of valid MTU values on the path between the source node and the destination node.

2. The method according to claim 1, wherein determining, by the protection device, the range of valid MTU values on the path between the source node and the destination node according to the IP address of the source node and the IP address of the destination node comprises:
   obtaining, by the protection device according to the IP address of the source node and the IP address of the destination node, a value of an MTU on a path from the source node to the destination node and a value of an MTU on a path from the destination node to the source node that are saved on the protection device;

determining that an upper limit of the range of valid MTU values on the path between the source node and the destination node is a greater value between the value of the MTU on the path from the source node to the destination node and the value of the MTU on the path from the destination node to the source node; and determining that a lower limit of the range of valid MTU values on the path between the source node and the destination node is a smaller value between the value of the MTU on the path from the source node to the destination node and the value of the MTU on the path from the destination node to the source node.

3. The method according to claim 1, wherein determining, by the protection device, the range of valid MTU values on the path between the source node and the destination node according to the IP address of the source node and the IP address of the destination node comprises querying, by the protection device according to the IP address of the source node and the IP address of the destination node, a path MTU range configured for the path between the source node and the destination node from a saved correspondence between an IP address pair and the path MTU range.

4. The method according to claim 1, wherein performing, by the protection device, the attack defense processing for the first packet comprises:
discarding, by the protection device, the first packet to trigger retransmission of the ICMPv6 Packet Too Big packet when the protection device determines that the first packet is an initial packet of a data flow to which the first packet belongs;
determining, by the protection device, that the first packet is a normal ICMPv6 Packet Too Big packet when the protection device receives a retransmitted second packet within a preset first time duration and the second packet is the ICMPv6 Packet Too Big packet; and
discharging the second packet following determination that the first packet is the normal ICMPv6 Packet Too Big packet.

5. The method according to claim 4, further comprising:
generating, by the protection device, a probe packet when the protection device determines that the first packet is not the initial packet of the data flow to which the first packet belongs;
sending the probe packet to the source node, wherein a packet length of the probe packet is greater than the MTU value obtained by the protection device from the first packet, and a first authentication field is comprised in the probe packet;
determining, by the protection device, whether a second authentication field is comprised in a third packet when the protection device receives the third packet within a preset second time duration, and the third packet is the ICMPv6 Packet Too Big packet;
determining, by the protection device, whether a value of the second authentication field in the third packet is the same as a value of the first authentication field in the probe packet when the second authentication field is comprised in the third packet;
comparing, by the protection device, the MTU value carried in the first packet and an MTU value carried in the third packet when the value of the second authentication field in the third packet is the same as the value of the first authentication field in the probe packet; and
determining, by the protection device, that the first packet is the normal ICMPv6 Packet Too Big packet when a difference between the MTU value carried in the first packet and the MTU value carried in the third packet is less than a preset threshold.

6. The method according to claim 4, further comprising:
generating, by the protection device, a probe packet when the protection device does not receive a retransmitted second packet within the preset first time duration;
sending the probe packet to the source node, wherein a packet length of the probe packet is greater than the MTU value obtained by the protection device from the first packet, and a first authentication field is comprised in the probe packet;
determining, by the protection device, whether a second authentication field is comprised in a third packet when the protection device receives the third packet within a preset second time duration and the third packet is the ICMPv6 Packet Too Big packet;
determining, by the protection device, whether a value of the second authentication field in the third packet is the same as a value of the first authentication field in the probe packet when the second authentication field is comprised in the third packet;
comparing, by the protection device, the MTU value carried in the first packet and an MTU value carried in the third packet when the value of the second authentication field in the third packet is the same as the value of the first authentication field in the probe packet; and
determining, by the protection device, that the first packet is the normal ICMPv6 Packet Too Big packet when a difference between the MTU value carried in the first packet and the MTU value carried in the third packet is less than a preset threshold.

7. The method according to claim 1, wherein performing, by the protection device, the attack defense processing for the first packet comprises:
generating, by the protection device, a probe packet;
sending the probe packet to the source node, wherein a packet length of the probe packet is greater than the MTU value obtained by the protection device from the first packet, and wherein a first authentication field is comprised in the probe packet;
determining, by the protection device, whether a second authentication field is comprised in a third packet when the protection device receives a third packet within a preset second time duration, and the third packet is the ICMPv6 Packet Too Big packet;
determining, by the protection device, whether a value of the second authentication field in the third packet is the same as a value of the first authentication field in the probe packet when the second authentication field is comprised in the third packet;
comparing, by the protection device, the MTU value carried in the first packet and an MTU value carried in the third packet when the value of the second authentication field in the third packet is the same as the value of the first authentication field in the probe packet; and
determining, by the protection device, that the first packet is a normal ICMPv6 Packet Too Big packet when a difference between the MTU value carried in the first packet and the MTU value carried in the third packet is less than a preset threshold.

8. The method according to claim 4, wherein after determining, by the protection device, that the first packet is the normal ICMPv6 Packet Too Big packet, the method further comprises updating, by the protection device, a saved value of the MTU on the path from the source node to the destination node to the MTU value obtained by the protection device from the first packet.

9. The method according to claim 5, wherein after determining, by the protection device, that the first packet is the normal ICMPv6 Packet Too Big packet, the method further comprises updating, by the protection device, a saved value of the MTU on the path from the source node to the destination node to the MTU value obtained by the protection device from the first packet.

10. The method according to claim 7, wherein after determining, by the protection device, that the first packet is the normal ICMPv6 Packet Too Big packet, the method further comprises updating, by the protection device, a saved value of the MTU on the path from the source node to the destination node to the MTU value obtained by the protection device from the first packet.

11. The method according to claim 1, wherein after receiving, by the protection device, the first packet, the method further comprises:
parsing, by the protection device, the first packet to obtain the IP address of the source node and the IP address of the destination node that are carried in the first packet when the protection device determines that the first packet is not the ICMPv6 Packet Too Big packet, and the protection device determines that the first packet is a normal service packet;
determining whether a packet length of the first packet is greater than a saved value of an MTU on a path from the source node to the destination node after parsing the first packet; and
updating, by the protection device, the value of the MTU on the path from the source node to the destination node to the packet length of the first packet when the first packet is a normal service packet, and the packet length of the first packet is greater than the saved value of the MTU on the path from the source node to the destination node.

12. A protection device, comprising:
a transmitter;
a receiver coupled to the transmitter and configured to receive a first packet;
a memory comprising instructions; and
a processor separately connected to the transmitter, the receiver, and the memory, wherein the instructions cause the processor to be configured to:
determine whether the first packet is an Internet Control Message Protocol version 6 (ICMPv6) Packet Too Big packet according to a value of an ICMP-type field in the first packet;
parse the first packet to obtain an Internet Protocol (IP) address of a source node, an IP address of a destination node, and a maximum transmission unit (MTU) value in the first packet when the first packet received by the receiver is the ICMPv6 Packet Too Big packet;
determine a range of valid MTU values on a path between the source node and the destination node according to the IP address of the source node and the IP address of the destination node; and
perform attack defense processing for the first packet when the MTU value does not belong to the range of valid MTU values on the path between the source node and the destination node.

13. The protection device according to claim 12, wherein the instructions further cause the processor to be configured to:
obtain, according to the IP address of the source node and the IP address of the destination node, a value of an MTU on a path from the source node to the destination node and a value of an MTU on a path from the destination node to the source node that are saved on the protection device;
determine that an upper limit of the range of valid MTU values on the path between the source node and the destination node is a greater one between the value of the MTU on the path from the source node to the destination node and the value of the MTU on the path from the destination node to the source node; and
determine that a lower limit of the range of valid MTU values on the path between the source node and the destination node is the smaller one of the value of the MTU on the path from the source node to the destination node and the value of the MTU on the path from the destination node to the source node.

14. The protection device according to claim 12, wherein the instructions further cause the processor to be configured to query and obtain a path MTU range configured for the path between the source node and the destination node from a saved correspondence between an IP address pair and a path MTU range according to the IP address of the source node and the IP address of the destination node.

15. The protection device according to claim 12, wherein the instructions further cause the processor to be configured to:
discard the first packet to trigger retransmission of the ICMPv6 Packet Too Big packet when it is determined that the first packet is an initial packet of a data flow to which the first packet belongs;
determine that the first packet is a normal ICMPv6 Packet Too Big packet when a retransmitted second packet is received within a preset first time duration and the second packet is the ICMPv6 Packet Too Big packet; and
discharge the second packet following determination that the first packet is the normal ICMPv6 Packet Too Big Packet.

16. The protection device according to claim 15, wherein the instructions further cause the processor to be configured to:
generate a probe packet when it is determined that the first packet is not the initial packet of the data flow to which the first packet belongs or the receiver does not receive a retransmitted second packet within a preset first time duration, wherein a packet length of the probe packet is greater than the MTU value obtained by the processor from the first packet, and an authentication field is comprised in the probe packet;
determine whether an authentication field is comprised in a third packet after the transmitter sends the probe packet to the source node, when the receiver receives a third packet within a preset second time duration, and the third packet is the ICMPv6 Packet Too Big packet;
determine whether a value of the authentication field in the third packet is the same as a value of the authentication field in the probe packet when an authentication field is comprised in the third packet;
compare the MTU value carried in the first packet and an MTU value carried in the third packet received by the receiver when the value of the authentication field in the third packet is the same as the value of the authentication field in the probe packet; and
determine that the first packet is the normal ICMPv6 Packet Too Big packet when a difference between the MTU value carried in the first packet and the MTU value carried in the third packet is less than a preset threshold, and wherein the transmitter is configured to send the probe packet generated by the processor to the source node.

17. The protection device according to claim 12, wherein the instructions further cause the processor to be configured to:
   generate a probe packet, wherein a packet length of the probe packet is greater than the MTU value obtained by the processor from the first packet, and wherein a first authentication field is comprised in the probe packet;
   determine whether a second authentication field is comprised in a third packet after the transmitter sends the probe packet to the source node, when the receiver receives the third packet within a preset second time duration, and wherein the third packet is the ICMPv6 Packet Too Big packet;
   determine whether a value of the second authentication field in the third packet is the same as a value of the first authentication field in the probe packet when the second authentication field is comprised in the third packet;
   compare the MTU value carried in the first packet and an MTU value carried in the third packet received by the receiver when the value of the second authentication field in the third packet is the same as the value of the first authentication field in the probe packet; and
   determine that the first packet is a normal ICMPv6 Packet Too Big packet when a difference between the MTU value carried in the first packet and the MTU value carried in the third packet is less than a preset threshold, wherein the transmitter is configured to send the probe packet generated by the processor to the source node.

18. The protection device according to claim 15, wherein the instructions further cause the processor to be configured to update the value of the MTU on the path from the source node to the destination node to the MTU value obtained by the processor from the first packet after it is determined that the first packet is the normal ICMPv6 Packet Too Big packet.

19. The protection device according to claim 16, wherein the instructions further cause the processor to be configured to update the value of the MTU on the path from the source node to the destination node to the MTU value obtained by the processor from the first packet after it is determined that the first packet is the normal ICMPv6 Packet Too Big packet.

20. The protection device according to claim 17, wherein the instructions further cause the processor to be configured to update the value of the MTU on the path from the source node to the destination node to the MTU value obtained by the processor from the first packet after it is determined that the first packet is the normal ICMPv6 Packet Too Big packet.

21. The protection device according to claim 12, wherein the instructions further cause the processor to be configured to:
   parse the first packet to obtain the IP address of the source node and the IP address of the destination node that are carried in the first packet, wherein the first packet received by the receiver is not the ICMPv6 Packet Too Big packet, and wherein the first packet received by the receiver is a normal service packet;
   determine whether a packet length of the first packet is greater than a saved value of the MTU on the path from the source node to the destination node; and
   update the value of the MTU on the path from the source node to the destination node to the packet length of the first packet, wherein the packet length of the first packet is greater than the saved value of the MTU on the path from the source node to the destination node.

* * * * *